United States Patent
Yu

(10) Patent No.: US 11,212,230 B2
(45) Date of Patent: Dec. 28, 2021

(54) QUALITY OF SERVICE CONTROL METHOD, DEVICE, AND SYSTEM

(71) Applicant: HUAWEI TECHNOLOGIES CO., LTD., Guangdong (CN)

(72) Inventor: Youyang Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 82 days.

(21) Appl. No.: 16/692,244

(22) Filed: Nov. 22, 2019

(65) Prior Publication Data

US 2020/0092212 A1 Mar. 19, 2020

Related U.S. Application Data

(63) Continuation of application No. PCT/CN2018/087518, filed on May 18, 2018.

(30) Foreign Application Priority Data

May 24, 2017 (CN) .......................... 201710374629.6
Aug. 28, 2017 (CN) .......................... 201710751046.0

(51) Int. Cl.
*H04L 12/851* (2013.01)
*H04L 12/46* (2006.01)
(Continued)

(52) U.S. Cl.
CPC ...... *H04L 47/2433* (2013.01); *H04L 12/4641* (2013.01); *H04L 12/66* (2013.01);
(Continued)

(58) Field of Classification Search
CPC ..... H04L 12/4641; H04L 12/66; H04L 47/20; H04L 47/2433; H04W 28/0268; H04W 72/085; H04W 88/16
See application file for complete search history.

(56) References Cited

U.S. PATENT DOCUMENTS 7,093,027 B1 * 8/2006 Shabtay .............. H04L 12/4633
370/216
8,249,104 B2 * 8/2012 Effenberger ............ H04L 69/08
370/471

(Continued)

FOREIGN PATENT DOCUMENTS

CN 101414940 A 4/2009
CN 101729398 A 6/2010

(Continued)

OTHER PUBLICATIONS

S2-172319 Ericsson et al.,"23.501: Cleanup of QoS framework description",SA WG2 Meeting #120, Mar. 27-31, 2017, Busan, Korea,total 10 pages.

(Continued)

*Primary Examiner* — Eric Nowlin

(57) ABSTRACT

This application discloses a QoS control method, device, and system, to implement QoS control when a 5G core network or another future network is accessed through a network such as, for example, a fixed network. The method, performed by an access gateway function entity, includes: obtaining a correspondence between a QoS file and a virtual local area network (VLAN) priority, where the correspondence between the QoS file and the VLAN priority includes a correspondence between a first QoS file and a first VLAN priority; sending a first message to a terminal, where the first message includes the correspondence between the QoS file and the VLAN priority; receiving an uplink data packet from the terminal, where a QoS file corresponding to the uplink data packet is the first QoS file, and the uplink data packet carries the first VLAN priority; and performing QoS control on the uplink data packet based on the first VLAN priority.

16 Claims, 10 Drawing Sheets

(51) Int. Cl.
*H04L 12/66* (2006.01)
*H04L 12/813* (2013.01)
*H04W 28/02* (2009.01)
*H04W 72/08* (2009.01)
*H04W 88/16* (2009.01)

(52) U.S. Cl.
CPC ......... *H04L 47/20* (2013.01); *H04W 28/0268* (2013.01); *H04W 72/085* (2013.01); *H04W 88/16* (2013.01)

(56) References Cited

U.S. PATENT DOCUMENTS

| | | | | |
|---|---|---|---|---|
| 8,526,466 | B2* | 9/2013 | Tischer | H04L 12/66 370/466 |
| 9,225,656 | B2* | 12/2015 | Yu | H04L 47/2491 |
| 9,979,557 | B2* | 5/2018 | Roy | H04L 12/46 |
| 10,177,936 | B2* | 1/2019 | Banavalikar | H04L 12/4633 |
| 10,447,541 | B2* | 10/2019 | Gaikwad | H04L 41/0893 |
| 10,623,308 | B2* | 4/2020 | Singh | H04L 45/38 |
| 10,742,476 | B2* | 8/2020 | Xu | H04W 88/16 |
| 2007/0195762 | A1* | 8/2007 | Choi | H04L 47/10 370/389 |
| 2010/0329263 | A1* | 12/2010 | Tischer | H04L 12/66 370/392 |
| 2012/0201138 | A1* | 8/2012 | Yu | H04L 47/2491 370/235 |
| 2012/0207022 | A1* | 8/2012 | Grayson | H04W 24/08 370/235 |
| 2012/0314568 | A1* | 12/2012 | Tan | H04W 12/08 370/230 |
| 2015/0351138 | A1 | 12/2015 | Metsala et al. | |
| 2016/0150439 | A1 | 5/2016 | Drevon et al. | |
| 2017/0048143 | A1* | 2/2017 | Roy | H04L 12/28 |
| 2018/0048537 | A1* | 2/2018 | Gaikwad | H04L 41/0896 |
| 2018/0241664 | A1* | 8/2018 | Singh | H04L 63/105 |
| 2019/0387428 | A1* | 12/2019 | Ahmad | H04L 69/08 |
| 2020/0007398 | A1* | 1/2020 | Gaikwad | H04L 41/0893 |
| 2020/0092212 | A1* | 3/2020 | Yu | H04W 28/0268 |
| 2020/0128430 | A1* | 4/2020 | Yi | H04W 28/0268 |
| 2020/0154304 | A1* | 5/2020 | Cho | H04W 28/02 |
| 2020/0267800 | A1* | 8/2020 | Kim | H04W 76/38 |
| 2020/0344769 | A1* | 10/2020 | Salkintzis | H04W 12/08 |

FOREIGN PATENT DOCUMENTS

| | | | | |
|---|---|---|---|---|
| CN | 102447669 | A | | 5/2012 |
| CN | 103546984 | A | | 1/2014 |
| CN | 104010332 | A | | 8/2014 |
| CN | 104704905 | A | | 6/2015 |
| CN | 105340321 | A | | 2/2016 |
| CN | 108965159 | A * | 12/2018 | ............. H04L 47/20 |
| CN | 110169118 | A * | 8/2019 | ............. H04W 76/27 |
| CN | 108965159 | B * | 1/2021 | ............. H04L 47/20 |
| EP | 2800417 | A1 | | 11/2014 |
| EP | 3569009 | A1 * | 11/2019 | ............. H04W 88/02 |
| EP | 3611962 | A1 * | 2/2020 | ........ H04W 28/0268 |
| EP | 3611962 | A4 * | 3/2020 | ......... H04W 72/085 |
| EP | 3569009 | A4 * | 9/2020 | ........ H04W 72/1284 |
| WO | 2014011008 | A1 | | 1/2014 |
| WO | WO-2017198132 | A1 * | 11/2017 | ........... H04W 28/24 |
| WO | WO-2018131902 | A1 * | 7/2018 | ........ H04W 28/0252 |
| WO | WO-2019054841 | A1 * | 3/2019 | ............. H04W 28/02 |

OTHER PUBLICATIONS

International Search Report issued in PCT/CN2018/087518 dated Aug. 21, 2018 (4 pages).
R3-151955 Huawei,"Discussion on QoS Mapping for LWA",3GPP TSG-RAN WG3 Meeting #89bis,Sophia Antipolis, France, Oct. 5-9, 2015,total 2 pages.

* cited by examiner

QUALITY OF SERVICE CONTROL METHOD, DEVICE, AND SYSTEM

CROSS-REFERENCE TO RELATED APPLICATIONS

This application is a continuation of International Application No. PCT/CN2018/087518, filed on May 18, 2018, which claims priority to Chinese Patent Application No. 201710374629.6, filed on May 24, 2017, and to Chinese Patent Application No. 201710751046.0, filed on Aug. 28, 2017, all of which are hereby incorporated by reference in their entireties.

TECHNICAL FIELD

This application relates to the field of communications technologies, and in particular, to a quality of service (QoS) control method, device, and system.

BACKGROUND

To cope with challenges from wireless broadband technologies and to maintain key advantages of a 3rd generation partnership project (3GPP) network, the 3GPP standards group had formulated a next generation mobile communications system (next generation system) network architecture by the end of 2016. The next generation mobile communications system network architecture is referred to as a 5th generation (5G) network architecture. This architecture supports not only access to a 5G core network through wireless technologies defined by the 3GPP standards group, but also access to a 5G core network through non-3GPP access technologies, for example, access to a 5G core network through a fixed network. Core network functions of the 5G core network are classified into a user plane (UP) function and a control plane (CP) function. A UP function entity is mainly responsible for forwarding a data packet, controlling quality of service (QoS), collecting charging information, and the like. A CP function entity is mainly responsible for delivering a data packet forwarding policy, a QoS control policy, and the like to the UP function entity.

However, currently, there is no related solution for implementing QoS control when the 5G core network is accessed through the fixed network.

SUMMARY

Embodiments of this application provide a QoS control method, device, and system, to implement QoS control when a 5G core network or another future network is accessed through a fixed network.

To achieve the foregoing objective, the embodiments of this application provide the following technical solutions.

According to a first aspect, a QoS control method is provided. The method includes: obtaining, by an access gateway function entity, a correspondence between a QoS file and a virtual local area network (VLAN) priority, where the correspondence between the QoS file and the VLAN priority includes a correspondence between a first QoS file and a first VLAN priority; sending, by the access gateway function entity, a first message to a terminal, where the first message includes the correspondence between the QoS file and the VLAN priority; receiving, by the access gateway function entity, an uplink data packet from the terminal, where a QoS file corresponding to the uplink data packet is the first QoS file, and the uplink data packet carries the first VLAN priority; and performing, by the access gateway function entity, QoS control on the uplink data packet based on the first VLAN priority. Based on this solution, the terminal can determine that a VLAN priority corresponding to the first QoS file is the first VLAN priority, so that when sending the uplink data packet to the access gateway function entity, the terminal can add the first VLAN priority to the uplink data packet, and the access gateway function entity performs QoS control on the uplink data packet based on the first VLAN priority. Therefore, based on the QoS control method provided in this embodiment of this application, QoS control can be implemented when a 5G core network or another future network is accessed through a fixed network.

In a possible design, the obtaining, by an access gateway function entity, a correspondence between a QoS file and a VLAN priority includes: generating, by the access gateway function entity, the correspondence between the QoS file and the VLAN priority; or receiving, by the access gateway function entity, a second message from a session management function entity, where the second message includes the correspondence between the QoS file and the VLAN priority.

In a possible design, the first message is a fixed network configuration message. In example embodiments, the fixed network configuration message is used in configuring QoS aspects associated with a fixed network.

Further, the fixed network configuration message may alternatively or additionally include a correspondence between the QoS file and a VLAN identifier (ID), and the correspondence between the QoS file and the VLAN ID includes a correspondence between the first QoS file and a first VLAN ID. Before the sending, by the access gateway function entity, a first message to a terminal, the method may further include: obtaining, by the access gateway function entity, the correspondence between the QoS file and the VLAN ID. That is, in this embodiment of this application, a network side may send the correspondence between the QoS file and the VLAN ID to the terminal.

Further, the method may include: receiving, by the access gateway function entity, a packet data unit (PDU) session establishment accept message from the session management function entity, where the PDU session establishment accept message includes a correspondence between the QoS file and a differentiated services code point (DSCP) value, and the correspondence between the QoS file and the DSCP value includes a correspondence between the first QoS file and a first DSCP value; and sending, by the access gateway function entity, the PDU session establishment accept message to the terminal. That is, in this embodiment of this application, the network side may alternatively or additionally send the correspondence between the QoS file and the DSCP value to the terminal.

In a possible design, the first message is a PDU session establishment accept message.

Further, after the generating, by the access gateway function entity, the correspondence between the QoS file and the VLAN priority, and before the sending, by the access gateway function entity, the first message to a terminal, the method may include: sending, by the access gateway function entity, a third message to the session management function entity, where the third message includes the correspondence between the QoS file and the VLAN priority; and receiving, by the access gateway function entity, the first message from the session management function entity.

Further, the third message and the PDU session establishment accept message may include a correspondence between the QoS file and a VLAN ID, and the correspondence between the QoS file and the VLAN ID includes a correspondence between the first QoS file and a first VLAN ID. Before the sending, by the access gateway function entity, a third message to the session management function entity, the method may include: generating, by the access gateway function entity, the correspondence between the QoS file and the VLAN ID. That is, in this embodiment of this application, the network side may send the correspondence between the QoS file and the VLAN ID to the terminal.

Further, the PDU session establishment accept message may alternatively or additionally include a correspondence between the QoS file and a DSCP value, and the correspondence between the QoS file and the DSCP value includes a correspondence between the first QoS file and a first DSCP value. That is, the network side may send the correspondence between the QoS file and the DSCP value to the terminal.

In a possible design, that the uplink data packet carries the first VLAN priority includes a VLAN priority in a layer-2 (L2) packet header of the uplink data packet being the first VLAN priority.

In a possible design, the method further includes: mapping, by the access gateway function entity, a VLAN ID in the L2 packet header of the uplink data packet to a QoS flow identifier (QFI) value, where the VLAN ID in the L2 packet header is the first VLAN ID; and sending, by the access gateway function entity, the uplink data packet to a UP function entity, where a packet header of the uplink data packet includes the QFI value. That is, in this embodiment of this application, the VLAN ID may be mapped to the QFI value, and further, the uplink data packet sent by the access gateway function entity to the UP function entity carries the QFI value, so that the UP function entity performs QoS control based on the QFI value.

In a possible design, the method further includes: mapping, by the access gateway function entity, a DSCP value in an internet protocol (IP) header of the uplink data packet to a QFI value, where the DSCP value in the IP header is the first DSCP; and sending, by the access gateway function entity, the uplink data packet to a UP function entity, where a packet header of the uplink data packet includes the QFI value. That is, the DSCP value may be mapped to the QFI value, and further, the uplink data packet sent by the access gateway function entity to the UP function entity carries the QFI value, so that the UP function entity performs QoS control based on the QFI value.

According to a second aspect, a QoS control method is provided. The method includes: receiving, by a terminal, a first message from an access gateway function entity, where the first message includes a correspondence between a QoS file and a VLAN priority, and the correspondence between the QoS file and the VLAN priority includes a correspondence between a first QoS file and a first VLAN priority; determining, by the terminal based on the correspondence, that a VLAN priority corresponding to the first QoS file is the first VLAN priority, where the first QoS file is a QoS file corresponding to a to-be-sent uplink data packet; and sending, by the terminal, the uplink data packet to the access gateway function entity, where the uplink data packet carries the first VLAN priority. Based on this solution, the terminal can determine that the VLAN priority corresponding to the first QoS file is the first VLAN priority, so that when sending the uplink data packet to the access gateway function entity, the terminal can add the first VLAN priority to the uplink data packet, and the access gateway function entity performs QoS control on the uplink data packet based on the first VLAN priority. Therefore, based on the QoS control method provided in this embodiment of this application, QoS control can be implemented when a 5G core network or another future network is accessed through a fixed network.

In a possible design, the first message is a fixed network configuration message; or the first message is a PDU session establishment accept message.

In a possible design, that the uplink data packet carries the first VLAN priority includes a VLAN priority in a layer-2 L2 packet header of the uplink data packet being the first VLAN priority.

In a possible design, a VLAN ID in the L2 packet header of the uplink data packet is a first VLAN ID.

Further, the first message may include a correspondence between the QoS file and a VLAN ID, and the correspondence between the QoS file and the VLAN ID includes a correspondence between the first QoS file and the first VLAN ID. After the receiving, by a terminal, a first message from an access gateway function entity, and before the sending by the terminal, the uplink data packet to the access gateway function entity, the method may include: determining, by the terminal based on the correspondence between the QoS file and the VLAN ID, the first VLAN ID corresponding to the first QoS file. That is, a network side may further send the correspondence between the QoS file and the VLAN ID to the terminal.

Optionally, before the sending, by the terminal, the uplink data packet to the access gateway function entity, the method further includes: determining, by the terminal, that the first VLAN ID corresponding to the first QoS file is a first QFI value included in the first QoS file. That is, the terminal may determine, based on the QoS file, the first VLAN ID corresponding to the first QoS file.

In a possible design, a DSCP value in an IP header of the uplink data packet is a first DSCP value.

Further, the first message may be the fixed network configuration message. Before the sending, by the terminal, the uplink data packet to the access gateway function entity, the method may include: receiving, by the terminal, the PDU session establishment accept message from the access gateway function entity, where the PDU session establishment accept message includes a correspondence between the QoS file and the DSCP value, and the correspondence between the QoS file and the DSCP value includes a correspondence between the first QoS file and the first DSCP value; and determining, by the terminal based on the correspondence between the QoS file and the DSCP value, the first DSCP value corresponding to the first QoS file. That is, the network side may send the correspondence between the QoS file and the DSCP value to the terminal.

Optionally, the first message is the PDU session establishment accept message, and the first message further includes a correspondence between the QoS file and the DSCP value. After the receiving, by a terminal, a first message from an access gateway function entity, and before the sending, by the terminal, the uplink data packet to the access gateway function entity, the method further includes: determining, by the terminal based on the correspondence between the QoS file and the DSCP value, the first DSCP value corresponding to the first QoS file. That is, the network side may send the correspondence between the QoS file and the DSCP value to the terminal.

Optionally, before the sending, by the terminal, the uplink data packet to the access gateway function entity, the method further includes: determining, by the terminal, that the first DSCP value corresponding to the first QoS file is the first QFI value included in the first QoS file. That is, the terminal may determine, based on the QoS file, the first DSCP value corresponding to the first QoS file.

According to a third aspect, an access gateway function entity is provided. The access gateway function entity has a function of implementing the method according to the first aspect. The function may be implemented by using hardware, or may be implemented by executing corresponding software by hardware. The hardware or the software includes one or more modules corresponding to the foregoing functions.

According to a fourth aspect, an access gateway function entity is provided. The access gateway function entity includes a processor, a memory, a bus, and a communications interface. The memory is configured to store computer executable instructions. The processor is connected to the memory by using the bus. When the access gateway function entity is run, the processor executes the computer executable instructions stored in the memory, so that the access gateway function entity performs any QoS control method according to any one of the first aspect or the implementations of the first aspect.

According to a fifth aspect, an embodiment of this application provides a computer-readable storage medium. The computer-readable storage medium stores instructions. When the instructions are run on a computer, the computer is enabled to perform any QoS control method according to any one of the first aspect or the implementations of the first aspect.

According to a sixth aspect, an embodiment of this application provides a computer program product including instructions. When the computer program product is run on a computer, the computer is enabled to perform any QoS control method according to any one of the first aspect or the implementations of the first aspect.

For technical effects brought by any design manner of the third aspect to the sixth aspect, refer to technical effects brought by different design manners of the first aspect.

According to a seventh aspect, a terminal is provided. The terminal has a function of implementing the method according to the second aspect. The function may be implemented by using hardware, or may be implemented by executing corresponding software by hardware. The hardware or the software includes one or more modules corresponding to the foregoing functions.

According to an eighth aspect, a terminal is provided. The terminal includes a processor, a memory, a bus, and a communications interface. The memory is configured to store computer executable instructions. The processor is connected to the memory by using the bus. When the terminal is run, the processor executes the computer executable instructions stored in the memory, so that the terminal performs any QoS control method according to the second aspect.

According to a ninth aspect, an embodiment of this application provides a computer-readable storage medium. The computer-readable storage medium stores instructions. When the instructions are run on a computer, the computer is enabled to perform any QoS control method according to any one of the second aspect or the implementations of the second aspect.

According to a tenth aspect, an embodiment of this application provides a computer program product including instructions. When the computer program product is run on a computer, the computer is enabled to perform any QoS control method according to any one of the second aspect or the implementations of the second aspect.

For technical effects brought by any design manner of the seventh aspect to the tenth aspect, refer to technical effects brought by different design manners of the second aspect.

According to an eleventh aspect, an embodiment of this application provides a QoS control system. The QoS control system includes an access gateway function entity and a session management function entity. The session management function entity is configured to: obtain a correspondence between a QoS file and a VLAN priority, and send a second message to the access gateway function entity, where the second message includes the correspondence between the QoS file and the VLAN priority, and the correspondence between the QoS file and the VLAN priority includes a correspondence between a first QoS file and a first VLAN priority. The access gateway function entity is configured to: receive the second message from the session management function entity, and sends a first message to a terminal, where the first message includes the correspondence between the QoS file and the VLAN priority. The access gateway function entity is further configured to: receive an uplink data packet from the terminal, and perform QoS control on the uplink data packet based on the first VLAN priority carried in the uplink data packet, where a QoS file corresponding to the uplink data packet is the first QoS file.

In a possible design, that the session management function entity is configured to obtain a correspondence between a QoS file and a VLAN priority includes: the session management function entity generates the correspondence between the QoS file and the VLAN priority.

In a possible design, the first message is a packet data unit PDU session establishment accept message. The access gateway function entity is further configured to: generate the correspondence between the QoS file and the VLAN priority, and send a third message to the session management function entity, where the third message includes the correspondence between the QoS file and the VLAN priority. That the session management function entity is configured to obtain a correspondence between a QoS file and a VLAN priority includes the session management function entity receives the third message from the access gateway function entity.

In a possible design, the QoS control system further includes a mobility management entity. The session management function entity is further configured to receive a fourth message from the mobility management entity before receiving the third message from the access gateway function entity, where the fourth message includes at least one of a fixed network access identifier or a fixed network access type. The session management function entity may be configured to send the PDU session establishment accept message to the access gateway function entity after determining, based on at least one of the fixed network access identifier or the fixed network access type, that the correspondence between the QoS file and the VLAN priority is received.

According to a twelfth aspect, a QoS control method is provided. The method includes: obtaining, by an access network resource control function entity, a first QoS file; obtaining, by the access network resource control function entity, a correspondence between the first QoS file and at least one of a first VLAN priority or a first VLAN ID; sending, by the access network resource control function entity, the correspondence to an access network device; and performing, by the access network device, QoS control on a received data packet based on the correspondence and the first VLAN priority or the first VLAN ID carried in the received data packet. Based on this solution, after receiving the first QoS file, the access network resource control function entity can obtain the correspondence between the first QoS file and at least one of the first VLAN ID or the first VLAN priority. Therefore, the access network resource control function entity can send the correspondence to the access network device. In this way, after receiving the data packet, the access network device can perform QoS control on the received data packet based on the correspondence and the first VLAN priority or the first VLAN ID carried in the received data packet. Therefore, QoS control can be implemented when a 5G core network or another future network is accessed through a fixed network.

In a possible design, the obtaining, by the access network resource control function entity, a correspondence between the first QoS file and at least one of a first VLAN priority or a first VLAN ID includes: generating, by the access network resource control function entity, the correspondence between the first QoS file and at least one of the first VLAN priority or the first VLAN ID based on the first QoS file; or receiving, by the access network resource control function entity, the correspondence that is between the first QoS file and at least one of the first VLAN priority or the first VLAN ID and that is from the access gateway function entity. That is, in this embodiment of this application, the correspondence may be generated by the access network resource control function entity, or may be received by the access network resource control function entity from another device. This is not specifically limited in embodiments of this application.

In a possible design, the generating, by the access network resource control function entity, the correspondence between the first QoS file and at least one of the first VLAN priority or the first VLAN ID based on the first QoS file includes: generating, by the access network resource control function entity, the correspondence between the first QoS file and the first VLAN ID based on packet data unit PDU session identifier information corresponding to the first QoS file, where the first VLAN ID includes the PDU session identifier information; or generating, by the access network resource control function entity, the correspondence between the first QoS file and the first VLAN ID based on a QFI or a 5QI in the first QoS file, where the first VLAN ID includes the 5QI or the QFI; or generating, by the access network resource control function entity, the correspondence between the first QoS file and the first VLAN ID based on PDU session identifier information corresponding to the first QoS file and a QFI or a 5QI in the first QoS file, where the first VLAN ID includes the PDU session identifier information and the 5QI or the QFI; or generating, by the access network resource control function entity, the correspondence between the first QoS file and the first VLAN priority based on the first QoS file and a local policy.

In a possible design, the correspondence is the correspondence between the first QoS file and the first VLAN priority, and the received data packet carries the first VLAN priority. The performing, by the access network device, QoS control on the received data packet based on the correspondence and the first VLAN priority carried in the received data packet includes: determining, by the access network device, the first QoS file based on the first VLAN priority and the correspondence; and performing, by the access network device, QoS control on the received data packet based on the first QoS file. Based on this solution, QoS control can be implemented on the received data packet.

In a possible design, the correspondence is the correspondence between the first QoS file and the first VLAN ID, and the received data packet carries the first VLAN ID. The performing, by the access network device, QoS control on the received data packet based on the correspondence and the first VLAN ID carried in the received data packet includes: determining, by the access network device, the first QoS file based on the first VLAN ID and the correspondence, and performing, by the access network device, QoS control on the received data packet based on the first QoS file. Based on this solution, QoS control can be implemented on the received data packet.

In a possible design, the correspondence is the correspondence between the first QoS file and the first VLAN priority, and the received data packet carries the first VLAN ID. The performing, by the access network device, QoS control on the received data packet based on the correspondence and the first VLAN ID carried in the received data packet includes: determining, by the access network device, the first VLAN priority corresponding to the first VLAN ID; determining, by the access network device, the first QoS file based on the first VLAN priority and the correspondence; and performing, by the access network device, QoS control on the received data packet based on the first QoS file. Based on this solution, QoS control can be implemented on the received data packet.

In a possible design, after the determining, by the access network device, the first VLAN priority corresponding to the first VLAN ID, the method further includes: setting, by the access network device, a VLAN priority in a layer-2 L2 packet header of the received data packet as the first VLAN priority. In this way, subsequently, a device can perform QoS control on the received data packet based on the first VLAN priority.

According to a thirteenth aspect, a QoS control system is provided. The QoS control system includes an access network resource control function entity and an access network device. The access network resource control function entity is configured to receive a first QoS file. The access network resource control function entity is further configured to obtain a correspondence between a first QoS file and at least one of a first VLAN priority or a first VLAN ID. The access network resource control function entity is further configured to send the correspondence to the access network device. The access network device is further configured to perform QoS control on the received data packet based on the correspondence and the first VLAN priority or the first VLAN ID carried in the received data packet.

According to a fourteenth aspect, a QoS control method is provided. The method includes: receiving, by a terminal, a downlink data packet from an access gateway function entity, where the downlink data packet carries a first VLAN priority; sending, by the terminal, an uplink data packet corresponding to the downlink data packet to the access gateway function entity, where the uplink data packet carries the first VLAN priority. Based on this solution, the terminal can determine, based on the first VLAN priority carried in the downlink data packet, the first VLAN priority carried in the uplink data packet, so that the access gateway function entity can perform QoS control on the uplink data packet based on the first VLAN priority. Therefore, QoS control can be implemented when a 5G core network or another future network is accessed through a fixed network.

These aspects or other aspects of this application are clearer and more comprehensible in descriptions of the following embodiments.

DESCRIPTION OF EMBODIMENTS

The following describes the technical solutions in the embodiments of this application with reference to the accompanying drawings. In this application, "/" means "or" unless otherwise specified. For example, A/B may represent A or B. In this application, "and/or" describes only an association relationship for describing associated objects and represents that three relationships may exist. For example, A and/or B may represent the following three cases: Only A exists, both A and B exist, and only B exists. In addition, "a plurality of" means two or more than two. In addition, to clearly describing the technical solutions in the embodiments of this application, terms such as "first" and "second" are used in this application to distinguish between same items or similar items that have basically same functions and purposes. A person skilled in the art may understand that the terms, such as "first" and "second", are not intended to limit a quantity or an execution sequence; and that terms, such as "first" and "second", do not indicate a definite difference. For example, a first message and a second message in embodiments of this application may be a same message, or may be different messages. This is not specifically limited in the embodiments of this application.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that, with evolution of the network architecture and emergence of new service scenarios, the technical solutions provided in the embodiments of this application are also applicable to similar technical problems.

Figure 1:
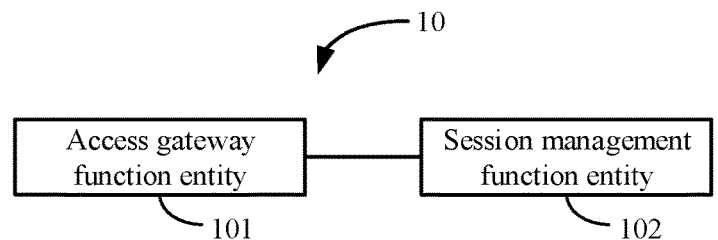
FIG. 1 is a schematic architectural diagram of a QoS control system according to an embodiment of this application.

FIG. 1 is a schematic architectural diagram of a QoS control system 10 according to an embodiment of this application. The QoS control system 10 includes an access gateway function entity 101 and a session management function entity 102.

The session management function entity 102 is configured to: obtain a correspondence between a QoS file and a virtual local area network (VLAN) priority, and send a second message to the access gateway function entity 101, where the second message includes the correspondence between the QoS file and the VLAN priority, and the correspondence between the QoS file and the VLAN priority includes a correspondence between a first QoS file and a first VLAN priority.

The access gateway function entity 101 is configured to: receive the second message from the session management function entity 102, and send a first message to a terminal, where the first message includes the correspondence between the QoS file and the VLAN priority.

The access gateway function entity 101 is further configured to: receive an uplink data packet from the terminal, and perform QoS control on the uplink data packet based on the first VLAN priority carried in the uplink data packet, where a QoS file corresponding to the uplink data packet is the first QoS file.

It should be noted that the access gateway function entity 101 and the session management function entity 102 in FIG. 1 may directly communicate with each other, or may communicate with each other through forwarding by another network device. This is not specifically limited in embodiments of this application.

Optionally, the access gateway function entity 101 in FIG. 1 may not need to communicate with the session management function entity 102. That is, in this embodiment of this application, the access gateway function entity 101 may alternatively perform QoS control. Details are as follows.

The access gateway function entity 101 is configured to: generate the correspondence between the QoS file and the VLAN priority, and send the first message to the terminal, where the first message includes the correspondence between the QoS file and the VLAN priority. The correspondence between the QoS file and the VLAN priority includes the correspondence between the first QoS file and the first VLAN priority.

The access gateway function entity 101 is further configured to receive the uplink data packet from the terminal, and perform QoS control on the uplink data packet based on the first VLAN priority carried in the uplink data packet, where the QoS file corresponding to the uplink data packet is the first QoS file.

Specifically, the QoS control system 10 may be applied to a 5G network that supports access through a fixed network, and/or another future network that supports access through the fixed network. This is not specifically limited in embodiments of this application.

Figure 2:
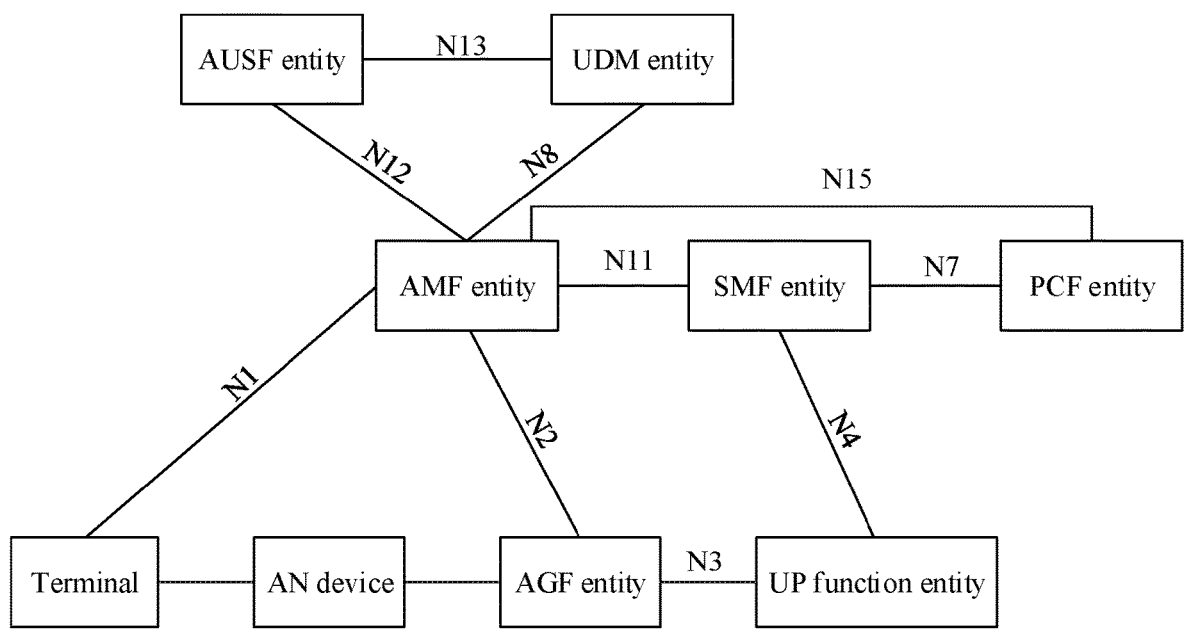
FIG. 2 is a schematic architectural diagram of a 5G network that supports access through a fixed network according to an embodiment of this application.

If the QoS control system 10 is applied to a 5G network that supports access through the fixed network, as shown in FIG. 2, a network element or an entity corresponding to the access gateway function entity 101 may be an access gateway function (AGF) entity, and a network element or an entity corresponding to the session management function entity 102 may be a session management function (SMF) entity. For functions of the AGF entity according to some embodiments, refer to the foregoing description of the access gateway function entity 101. For functions of the SMF entity according to some embodiments, refer to the foregoing description of the session management function entity 102.

In addition, as shown in FIG. 2, a 5G network that supports access through the fixed network may further include an access network (AN) device, a unified data management (UDM) entity, an authentication server function (AUSF) entity, an access and mobility management function (AMF) entity, a policy control function (PCF) entity, a UP function entity, and the like. The terminal communicates with the AMF entity through a next generation network (N) interface 1 (N1 for short), and communicates with the AGF entity through the AN device. The AGF entity communicates with the AMF entity through an N interface 2 (N2 for short). The AMF entity communicates with the SMF entity through an N interface 11 (N11 for short), communicates with the UDM entity through an N interface 8 (N8 for short), communicates with the AUSF entity through an N interface 12 (N12 for short), and communicates with the PCF entity through an N interface 15 (N15 for short). The SMF entity communicates with the PCF entity through an N interface 7 (N7 for short), and communicates with the UPF entity through an N interface 4 (N4 for short).

In addition, the UDM entity, the AUSF entity, the PCF entity, the AMF entity, and the SMF entity in FIG. 2 may alternatively be collectively referred to as a CP function entity. This is not specifically limited in embodiments of this application.

A 5G network that supports access through a fixed network, such as that shown in FIG. 2, may also support access through a mobile network. This is not specifically limited in embodiments of this application. When the 5G network supports access through the mobile network, the AN device may directly communicate with the UPF entity. For details, refer to an existing 5G mobile network architecture.

It should be noted that the terms terminal, the AN device, the AMF entity, the SMF entity, the AUSF entity, the UDM entity, the AGF entity, the UP function entity, the PCF entity, and the like in the foregoing description of the example 5G network are merely names, and that the names constitute no limitation on the devices. In the 5G network and the another future network, network elements or entities corresponding to the terminal, the AN device, the AMF entity, the SMF entity, the AUSF entity, the UDM entity, the AGF entity, the UP function entity, and the PCF entity may alternatively have other names. This is not specifically limited in embodiments of this application. For example, the UDM entity may be replaced with a home subscriber server (HSS), a user subscription database (USD), or a database entity.

Figure 13:
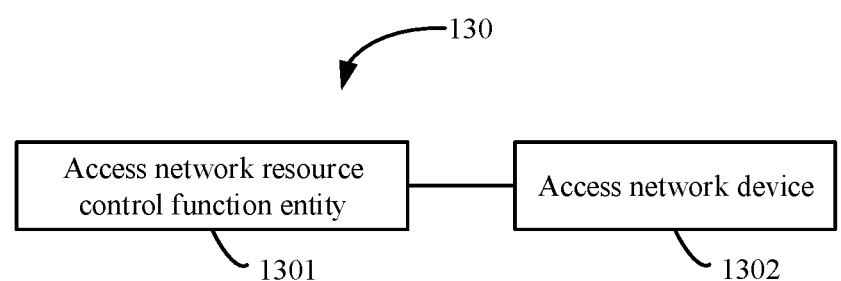
FIG. 13 is a schematic architectural diagram of another QoS control system according to an embodiment of this application.

FIG. 13 is a schematic architectural diagram of another QoS control system 130 according to an embodiment of this application. The QoS control system 130 includes an access network resource control function entity 1301 and an access network device 1302. The access network resource control function entity 1301 is configured to obtain a first QoS file, and obtain a correspondence between the first QoS file and at least one of a first VLAN priority or a first VLAN ID. The access network resource control function entity 1301 is further configured to send the correspondence to the access network device 1302. The access network device 1302 is further configured to perform QoS control on a received data packet based on the correspondence and the first VLAN priority or the first VLAN ID carried in the received data packet.

It should be noted that the access network resource control function entity 1301 and the access network device 1302 in FIG. 13 may directly communicate with each other, or may communicate with each other through forwarding by another network device. This is not specifically limited in embodiments of this application.

Specifically, the QoS control system 130 may be applied to a 5G network that supports access through a fixed network and another future network that supports access through the fixed network. This is not specifically limited in embodiments of this application.

If the QoS control system 130 is applied to a 5G network that supports access through a fixed network, a network element or an entity corresponding to the access network resource control function entity 1301 may be an access network resource control function (ARCF) entity, and a network element or an entity corresponding to the access network device 1302 may be an AN device. For a main function of the ARCF entity, refer to the foregoing description of the access network resource control function entity 1301. For a main function of the AN device, refer to the foregoing description of the access network device 1302.

In addition, as shown in FIG. 2, a 5G network that supports access through a fixed network may further include other network devices. For details, refer to the description of FIG. 2.

It should be noted that the ARCF entity is not shown in FIG. 2, and the function of the ARCF entity may be deployed in an AGF entity, or may be independent of the AGF entity. This is not specifically limited in embodiments of this application. In addition, the ARCF entity may be replaced with an access network resource management server or another device. This is not specifically limited in embodiments of this application.

It should be noted that the terminal in this application may include various handheld devices, in-vehicle devices, wearable devices, or computing devices that have a wireless communication function, or other processing devices connected to a wireless modem, and various forms of terminals, mobile stations (MS), user equipment (UE), terminal equipment, customer premise equipment (CPE), soft terminals, and the like. For ease of description, in this application, the devices mentioned above are collectively referred to as terminals.

The access gateway function entity 101 and the session management function entity 102 in FIG. 1 in the embodiments of this application may be implemented by one physical device, may be jointly implemented by a plurality of physical devices, or may be a logical function module in one physical device. This is not specifically limited in the embodiments of this application.

Figure 3:
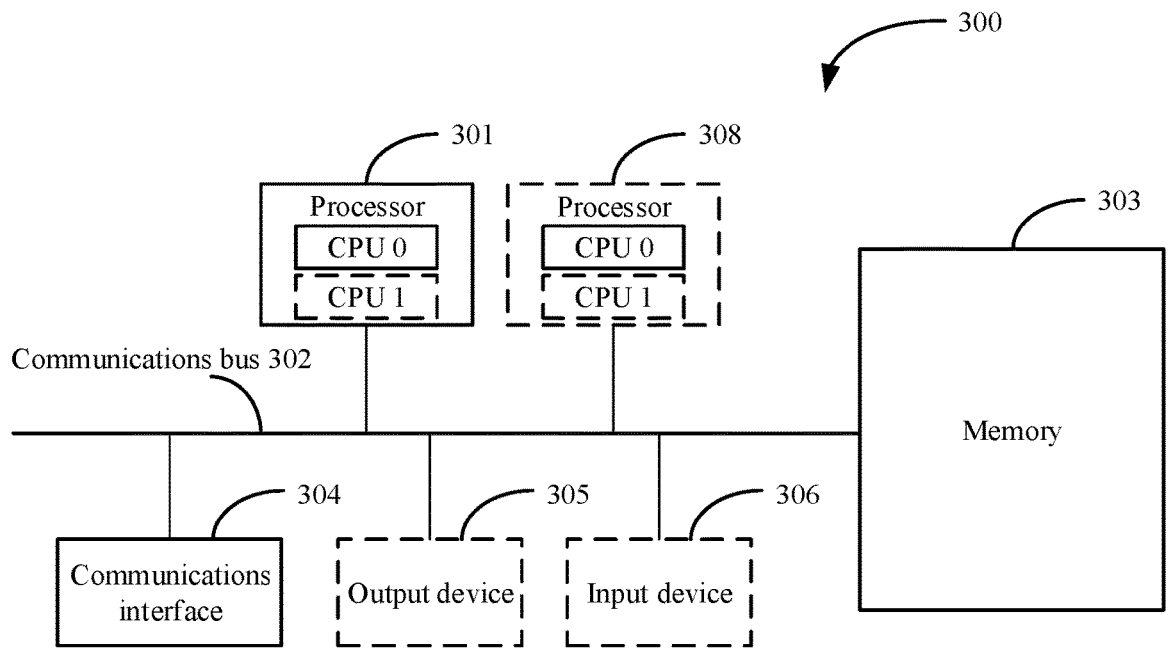
FIG. 3 is a schematic diagram of a hardware structure of a communications device according to an embodiment of this application.

The access gateway function entity 101, the session management function entity 102, and the terminal described above may be implemented by a communications device such as that shown in FIG. 3.

FIG. 3 is a schematic diagram of a hardware structure of a communications device according to some embodiments of this application. The communications device 300 includes at least one processor 301, a communications bus 302, a memory 303, and at least one communications interface 304.

The processor 301 may be a general-purpose central processing unit (CPU), a microprocessor, an application-specific integrated circuit (ASIC), or one or more integrated circuits configured to control program execution of the solutions in this application.

The communications bus 302 may include a path for transmitting information between the foregoing components of the communications device 300.

The communications interface 304 is configured to communicate, by using any apparatus such as a transceiver, with another device or a communications network such as, for example, Ethernet, a radio access network (RAN), or a wireless local area network (WLAN).

The memory 303 may be a read-only memory (ROM) or another type of static storage device capable of storing static information and instructions, a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray optical disc, and the like), a magnetic disk storage medium or another magnetic storage device, or any other medium capable of carrying or storing expected program code in a form of an instruction or a data structure and capable of being accessed by a computer, but is not limited thereto. The memory may exist separately from the processor 301, and is connected to the processor by using a bus. Alternatively, the memory may be integrated with the processor.

The memory 303 is configured to store application program code for executing the solutions in this application, and the processor 301 controls the execution. The processor 301 is configured to execute the application program code stored in the memory 303, and to implement a QoS control method provided in the embodiments of this application.

In an embodiment, the processor 301 may include one or more CPUs, for example, a CPU 0 and a CPU 1 in FIG. 3.

In an embodiment, the communications device 300 may include a plurality of processors such as the processor 301 and a processor 308 in FIG. 3. Each of these processors may be a single-core (single-CPU) processor, or may be a multi-core (multi-CPU) processor. The processor herein may be one or more devices, circuits, and/or processing cores configured to process data (for example, a computer program instruction).

In an embodiment, the communications device 300 may further include an output device 305 and an input device 306. The output device 305 communicates with the processor 301, and may display information in a plurality of manners. For example, the output device 305 may be a liquid crystal display (LCD), a light emitting diode (LED) display device, a cathode ray tube (CRT) display device, a projector (projector), or the like. The input device 306 communicates with the processor 301, and may receive input of a user in a plurality of manners. For example, the input device 306 may be a mouse, a keyboard, a touchscreen device, a sensing device, or the like.

The communications device 300 may be a general-purpose computer device or a special-purpose computer device. According to some embodiments, the communications device 300 may be a desktop computer, a portable computer, a network server, a personal digital assistant (PDA), a mobile phone, a tablet computer, a terminal device, an embedded device, or a device with a structure similar to that in FIG. 3. A type of the communications device 300 is not limited in embodiments of this application.

The following describes the QoS control method provided in the embodiments of this application with reference to FIG. 1 to FIG. 3.

Figure 4:
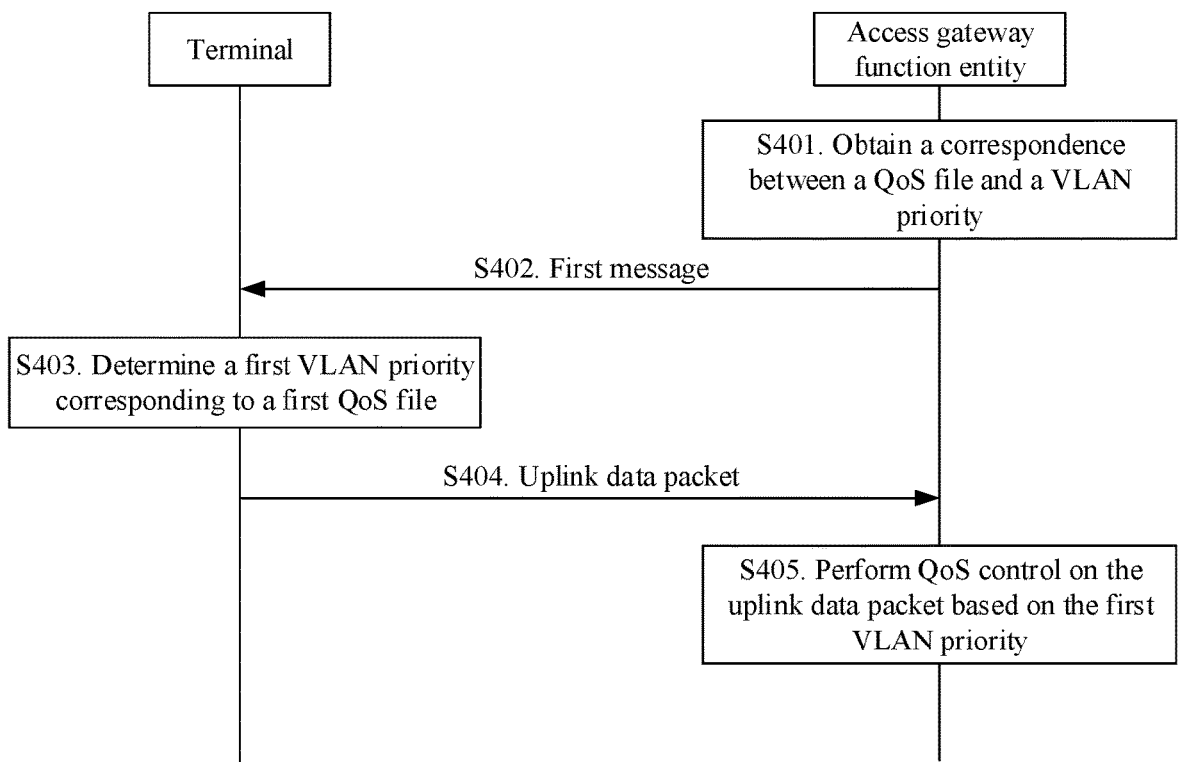
FIG. 4 is a first schematic flowchart of a QoS control method according to an embodiment of this application.

First, with reference to the QoS control system 10 shown in FIG. 1, FIG. 4 is a schematic flowchart of a QoS control method according to an embodiment of this application. The method includes the following steps.

S401. An access gateway function entity obtains a correspondence between a QoS file and a VLAN priority, where the correspondence between the QoS file and the VLAN priority includes a correspondence between a first QoS file and a first VLAN priority.

S402. The access gateway function entity sends a first message to a terminal, so that the terminal receives the first message. The first message includes the correspondence between the QoS file and the VLAN priority.

S403. The terminal determines, based on the correspondence, that a VLAN priority corresponding to the first QoS file is the first VLAN priority, where the first QoS file is a QoS file corresponding to a to-be-sent uplink data packet.

S404. The terminal sends an uplink data packet to the access gateway function entity, so that the access gateway function entity receives the uplink data packet. The uplink data packet carries the first VLAN priority.

S405. The access gateway function entity performs QoS control on the uplink data packet based on the first VLAN priority.

According to the QoS control method provided in this embodiment of this application, the terminal can determine that the VLAN priority corresponding to the first QoS file is the first VLAN priority, so that when sending the uplink data packet to the access gateway function entity, the terminal can add the first VLAN priority to the uplink data packet, and the access gateway function entity performs QoS control on the uplink data packet based on the first VLAN priority. Therefore, based on the QoS control method provided in this embodiment of this application, QoS control can be implemented when a 5G core network or another future network is accessed through a fixed network.

The foregoing actions of the access gateway function entity in S401, S402, and S405 may be performed by the processor 301 in the communications device 300 shown in FIG. 3 by invoking application program code stored in the memory 303. This is not limited in embodiments of this application.

The foregoing actions of the terminal in S403 and S404 may be performed by the processor 301 in the communications device 300 shown in FIG. 3 by invoking application program code stored in the memory 303. This is not limited in embodiments of this application.

Figure 5:
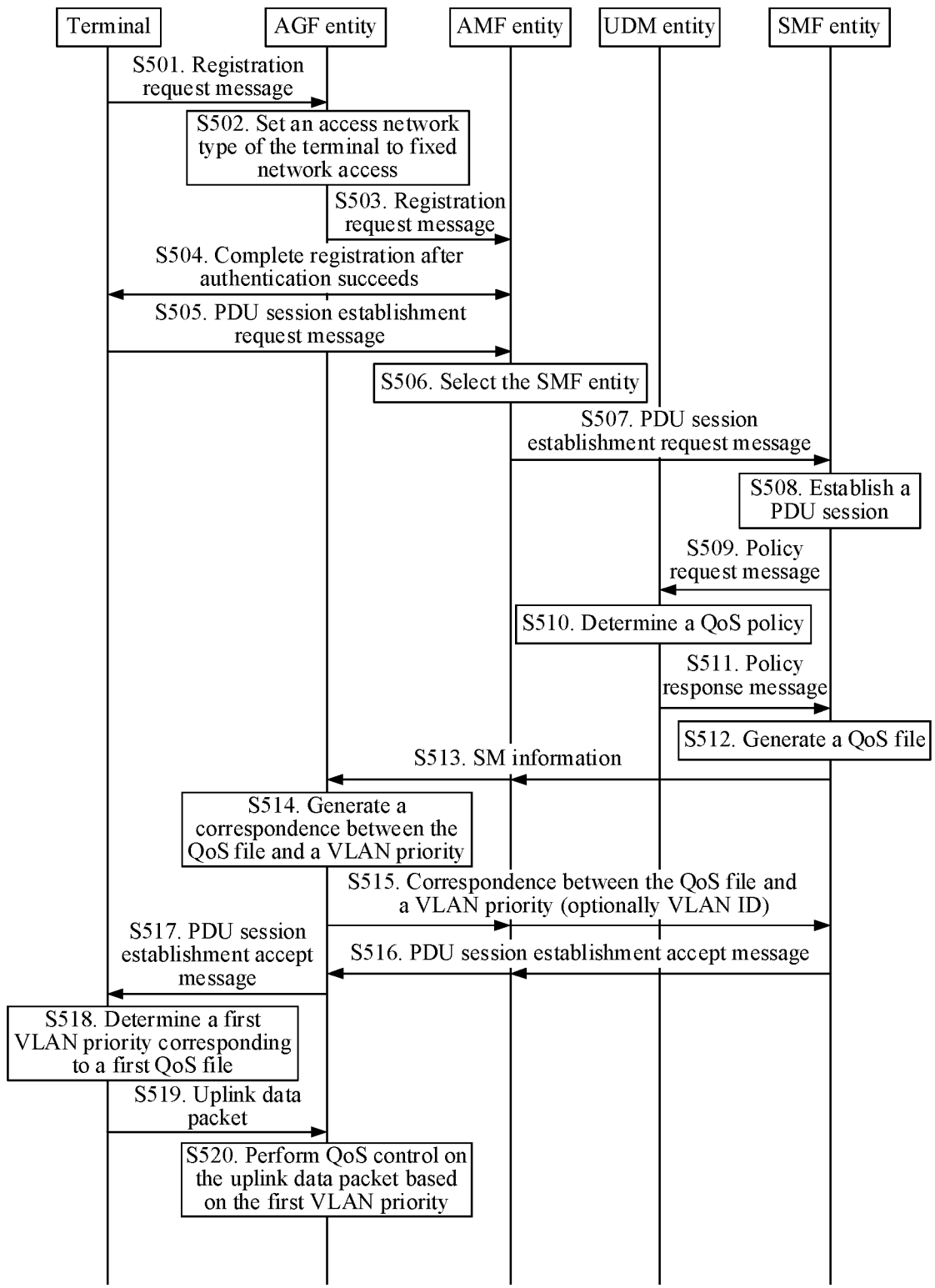
FIG. 5 is a second schematic flowchart of a QoS control method according to an embodiment of this application.

Then, in FIG. 5, an example in which the QoS control system 10 shown in FIG. 1 is applied to the 5G network that supports access through the fixed network and that is shown in FIG. 2 is used to further describe the QoS control method shown in FIG. 4.

FIG. 5 is a schematic flowchart of a QoS control method according to an embodiment of this application. The QoS control method relates to interaction between a terminal, an AGF entity, an AMF entity, a UDM entity, and an SMF entity, and includes the following steps.

S501. A terminal sends a registration request message to the AGF entity, so that the AGF entity receives the registration request message. The registration request message includes a terminal identifier and fixed network slice information.

Optionally, in this embodiment of this application, the terminal identifier may be a complete permanent terminal identity, for example, an international mobile subscriber identity (IMSI), or may be a part of a permanent terminal identity, for example, a part of information in the IMSI, or may be a terminal identity on which security protection is performed, for example, IMSI information protected by using a hash algorithm, or may be a media access control (MAC) address of the terminal, a user name of the terminal, or the like. Content of the terminal identifier is not specifically limited in embodiments of this application.

Optionally, in this embodiment of this application, existing slice selection information may be set as the fixed network slice information.

S502. The AGF entity sets an access network type of the terminal to fixed network access based on the terminal identifier and the fixed network slice information in the registration request message.

S503. The AGF entity sends an N2 message to the AMF entity, so that the AMF entity receives the N2 message. The N2 message includes the registration request message.

Optionally, the N2 message may further include an access point identifier. The access point identifier is included in the registration request message carried in the N2 message, or the AGF sends the access point identifier to the AMF entity by using a parameter of the N2 message. This is not specifically limited in embodiments of this application.

S504. The AMF entity performs authentication on the terminal based on the terminal identifier, and the AMF entity completes, for a terminal on which authentication succeeds, a registration procedure of the terminal.

S505. The terminal sends a PDU session establishment request message to the AMF entity, so that the AMF entity receives the PDU session establishment request message. The PDU session establishment request message includes at least one of the terminal identifier and the access point identifier, and at least one of a fixed network service identifier and the fixed network slice information.

S506. The AMF entity selects the SMF entity based on at least one of the fixed network service identifier and the fixed network slice information.

S507. The AMF entity sends an N11 message to the SMF entity, where the N11 message includes the PDU session establishment request message.

Optionally, the N11 message may further include at least one of the access network type and the access point identifier.

S508. The SMF entity establishes a PDU session for the terminal based on the PDU session establishment request message. A known procedure can be used for an establishment procedure of the PDU session.

S509. The SMF entity sends a policy request message to the UDM entity, so that the UDM entity receives the policy request message, where the policy request message includes at least one of the terminal identifier and the access point identifier.

S510. The UDM entity determines a QoS policy based on at least one of the terminal identifier and the access point identifier.

S511. The UDM entity sends a policy response message to the SMF entity, so that the SMF entity receives the policy response message. The policy response message includes the QoS policy.

S512. The SMF entity generates one or more QoS files according to the QoS policy.

Optionally, a QoS file in this embodiment of this application includes at least one of a QoS flow identifier (QFI), flow description information, a 5G QoS indicator (5QI), and a QoS parameter. The QoS parameter includes at least one of an allocation and retention priority (ARP), a guaranteed bandwidth, a maximum flow bit rate (MFBR), and a guaranteed flow bit rate (GFBR).

Optionally, in this embodiment of this application, alternatively, the AMF entity may send the policy request message to the UDM entity. After the UDM entity sends the policy response message including the QoS policy to the AMF entity, the AMF entity sends the QoS policy to the SMF entity. This is not specifically limited in embodiments of this application. Specifically, the AMF entity may send the policy request message to the UDM entity after step S503. The policy request message includes at least one of the terminal identifier and the access point identifier. After determining the QoS policy based on at least one of the terminal identifier and the access point identifier, the UDM entity sends the policy response message including the QoS policy to the AMF entity. After receiving the policy response message from the UDM entity, the AMF entity stores the QoS policy. Further, in step S507, when the AMF entity sends the N11 message to the SMF entity, the N11 message may include the QoS policy. In this way, the SMF entity may obtain the QoS policy.

In some embodiments of this application, an operator stores the QoS policy in the UDM. The operator may alternatively store the QoS policy in another device on a network side, for example, in a PCF entity. When the QoS policy is stored in another device on the network side, for an implementation of obtaining the QoS policy from the another device, refer to the foregoing implementation description of obtaining the QoS policy from the UDM entity, and only the UDM entity in the foregoing solution needs to be replaced with the PCF entity or the other device on which the QoS policy is stored by the operator.

S513. The SMF entity sends session management (SM) information to the AGF entity by using the AMF entity, so that the AGF entity receives the SM information. The SM information includes one or more QoS files.

Optionally, the SM information may further include a PDU session identifier and a tunnel identifier, so that a tunnel is established between the AGF entity and a UPF entity. Tunnel establishment in this step may be performed using known techniques.

Optionally, if the N11 message in step S507 includes at least one of the access network type and the access point identifier, the SMF entity sends a PDU session establishment accept message to the AGF entity after determining that a correspondence that is between a QoS file and a VLAN priority and that is generated by the AGF entity is received, which specifically includes the following steps.

S514. The AGF entity determines an acceptable QoS file from the one or more QoS files, and for the acceptable QoS file, the AGF entity generates a correspondence between the QoS file and a VLAN priority. The correspondence between the QoS file and the VLAN priority includes a correspondence between a first QoS file and a first VLAN priority.

Optionally, the AGF entity may generate the correspondence between the QoS file and the VLAN priority based on at least one of configuration information or a policy. This is not specifically limited in embodiments of this application.

Optionally, if there are a plurality of acceptable QoS files in this embodiment of this application, the plurality of QoS files may correspond to a same VLAN priority, or the plurality of QoS files may respectively correspond to different VLAN priorities. This is not specifically limited in embodiments of this application. When the plurality of QoS files correspond to the same VLAN priority, the similar QoS files may be aggregated to have the same VLAN priority according to an aggregation principle. The aggregation principle may be, for example, setting a same VLAN priority for QoS files that have a same 5QI and/or ARP.

Optionally, for the acceptable QoS file, the AGF entity may further generate a correspondence between the QoS file and a VLAN ID. The correspondence between the QoS file and the VLAN ID includes a correspondence between the first QoS file and a first VLAN ID.

Optionally, if there are a plurality of acceptable QoS files in this embodiment of this application, the plurality of QoS files may correspond to a same VLAN ID, or the plurality of QoS files may respectively correspond to different VLAN IDs. This is not specifically limited in embodiments of this application. When the plurality of QoS files correspond to the same VLAN ID, the similar QoS files may be aggregated to have the same VLAN ID according to an aggregation principle. The aggregation principle may be, for example, setting a same VLAN ID for QoS files that have a same 5QI and/or ARP.

S515. The AGF entity sends the correspondence between the QoS file (i.e. the selected QoS file, if more than one QoS file) and the VLAN priority to the SMF entity by using the AMF entity, so that the AMF entity receives the correspondence between the QoS file and the VLAN priority.

Optionally, if the AGF entity further generates the correspondence between the QoS file and the VLAN ID, the AGF entity further sends the correspondence between the QoS file and the VLAN ID to the SMF entity by using the AMF entity.

S516. The SMF entity sends the PDU session establishment accept message to the AGF by using the AMF entity, so that the AGF entity receives the PDU session establishment accept message. The PDU session establishment accept message includes the correspondence that is between the QoS file and the VLAN priority and that is generated by the AGF entity.

Optionally, if the AGF entity further sends the correspondence between the QoS file and the VLAN ID to the SMF entity by using the AMF entity, the PDU session establishment accept message further includes the correspondence between the QoS file and the VLAN ID.

Optionally, for the acceptable QoS file, the SMF entity may further generate a correspondence between the QoS file and a differentiated services code point (DSCP) value. Further, the PDU session establishment accept message may further include the correspondence between the QoS file and the DSCP value. This is not specifically limited in embodiments of this application. The correspondence between the QoS file and the DSCP value includes a correspondence between the first QoS file and a first DSCP value.

Optionally, if there are a plurality of acceptable QoS files in this embodiment of this application, the plurality of QoS files may correspond to a same DSCP value, or the plurality of QoS files may respectively correspond to different DSCP values. This is not specifically limited in embodiments of this application. When the plurality of QoS files correspond to the same DSCP value, the similar QoS files may be aggregated to have the same DSCP value according to an aggregation principle. The aggregation principle may be, for example, setting a same DSCP value for QoS files that have a same 5QI and/or ARP.

S517. The AGF entity sends the PDU session establishment accept message to the terminal, so that the terminal receives the PDU session establishment accept message.

The PDU session establishment accept message sent by the AGF entity to the terminal is a forwarded PDU session establishment accept message that is sent by the SMF entity to the AGF entity by using the AMF entity.

S518. The terminal determines, based on the correspondence between the QoS file and the VLAN priority, that a VLAN priority corresponding to the first QoS file is the first VLAN priority. The first QoS file is a QoS file corresponding to a to-be-sent uplink data packet.

S519. The terminal sends an uplink data packet to the AGF entity, so that the AGF entity receives the uplink data packet. The uplink data packet carries the first VLAN priority.

Optionally, that the uplink data packet carries the first VLAN priority may specifically include a VLAN priority in a layer-2 (L2) packet header of the uplink data packet is the first VLAN priority. That is, the terminal may set the VLAN priority in the L2 packet header as the first VLAN priority.

Optionally, a VLAN ID in the L2 packet header of the uplink data packet is the first VLAN ID. That is, the terminal may set the VLAN ID in the L2 packet header as the first VLAN ID.

In a possible implementation, the terminal may determine, based on the correspondence between the QoS file and the VLAN ID, the first VLAN ID corresponding to the first QoS file.

In a possible implementation, the terminal may determine that the first VLAN ID corresponding to the first QoS file is the first QFI value included in the first QoS file.

Optionally, a DSCP value in an internet protocol (IP) header of the uplink data packet is the first DSCP value.

In a possible implementation, the terminal may determine, based on the correspondence between the QoS file and the DSCP value, the first DSCP value corresponding to the first QoS file.

In a possible implementation, the terminal may determine that the first DSCP value corresponding to the first QoS file is the first QFI value included in the first QoS file.

S520. The AGF entity performs QoS control on the uplink data packet based on the first VLAN priority.

For example, that the AGF entity performs QoS control on the uplink data packet based on the first VLAN priority includes:

for data packets with different VLAN priorities, the AGF entity preferentially schedules a data packet with a higher VLAN priority; or for data packets with a same VLAN priority, a bandwidth may be controlled to be a sum of bandwidths included in first QoS files corresponding to a same first VLAN priority.

Alternatively, that the AGF entity performs QoS control on the uplink data packet based on the first VLAN priority includes the AGF entity performs QoS control on the uplink data packet based on a locally configured QoS policy corresponding to the first VLAN priority, where the QoS policy may include at least one of the MFBR and the GFBR.

In addition, the AGF entity may further perform admission control on a data packet based on at least one of a guaranteed bandwidth and/or an ARP in the QoS file. For example, when a current bandwidth is lower than the guaranteed bandwidth, the AGF entity continues to send a received data packet. Otherwise, the AGF entity buffers or discards the received data packet.

Optionally, if the VLAN ID in the L2 packet header of the uplink data packet is the first VLAN ID, the AGF entity may further map the first VLAN ID into a QFI value, and further add the QFI value to the uplink data packet when sending the uplink data packet to the UP function entity, so that the UP function entity performs QoS control based on the QFI value. This is not specifically limited in embodiments of this application.

Optionally, if the DSCP value in the IP header of the uplink data packet is the first DSCP value, the AGF entity may further map the first DSCP value to a QFI value, and further add the QFI value to the uplink data packet when sending the uplink data packet to the UP function entity, so that the UP function entity performs QoS control based on the QFI value. This is not specifically limited in embodiments of this application.

According to the QoS control method provided in this embodiment of this application, the terminal can determine that the VLAN priority corresponding to the first QoS file is the first VLAN priority, so that when sending the uplink data packet to the access gateway function entity, the terminal can add the first VLAN priority to the uplink data packet, and the access gateway function entity performs QoS control on the uplink data packet based on the first VLAN priority. Therefore, based on the QoS control method provided in this embodiment of this application, QoS control can be implemented when a 5G core network or another future network is accessed through a fixed network.

The foregoing actions of the terminal in S501, S504, S505, S518, and S519 may be performed by the processor 301 in the communications device 300 shown in FIG. 3 by invoking application program code stored in the memory 303. This is not limited in embodiments of this application.

The foregoing actions of the AGF entity in S502, S503, S514, S515, S517, and S520 may be performed by the processor 301 in the communications device 300 shown in FIG. 3 by invoking application program code stored in the memory 303. This is not limited in embodiments of this application.

The foregoing actions of the SMF entity in S508, S509, S512, S513, and S516 may be performed by the processor 301 in the communications device 300 shown in FIG. 3 by invoking application program code stored in the memory 303. This is not limited in embodiments of this application.

Figure 6:
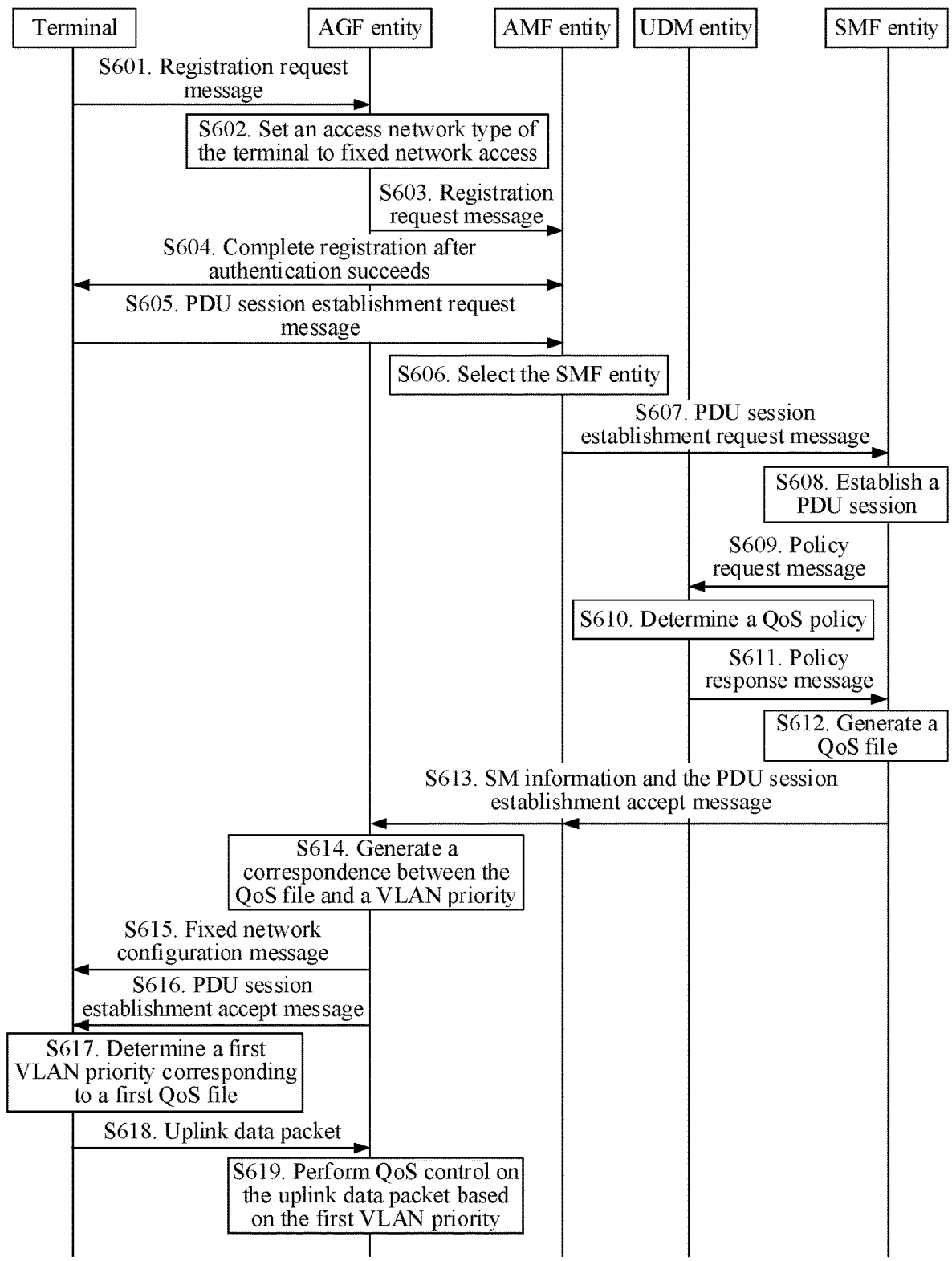
FIG. 6 is a third schematic flowchart of a QoS control method according to an embodiment of this application.

Optionally, FIG. 6 is a schematic flowchart of another QoS control method according to an embodiment of this application. The QoS control method relates to interaction between a terminal, an AGF entity, an AMF entity, a UDM entity, and an SMF, and includes the following steps.

S601 to S612 are the same as S501 to S512. For details, refer to the embodiment shown in FIG. 5.

S613. The SMF entity sends SM information and a PDU session establishment accept message to the AGF entity by using the AMF entity, so that the AGF entity receives the SM information and the PDU session establishment accept message. The SM information includes one or more QoS files, and the PDU session establishment accept message includes an IP address assigned by the SMF entity to the terminal.

Optionally, the SM information may further include a PDU session identifier and a tunnel identifier, so that a tunnel is established between the AGF entity and the UPF entity. Tunnel establishment in this step may be performed using known techniques.

Optionally, after the SMF entity generates the one or more QoS files, the SMF entity may further generate a correspondence between a QoS file and a DSCP value. Further, the PDU session establishment accept message may further include the correspondence between the QoS file and the DSCP value. This is not specifically limited in embodiments of this application. The correspondence between the QoS file and the DSCP value includes a correspondence between a first QoS file and a first DSCP value.

Optionally, if there are a plurality of QoS files in this embodiment of this application, the plurality of QoS files may correspond to a same DSCP value, or the plurality of QoS files may respectively correspond to different DSCP values. This is not specifically limited in embodiments of this application. When the plurality of QoS files correspond to the same DSCP value, the similar QoS files may be aggregated to have the same DSCP value according to an aggregation principle. The aggregation principle may be, for example, setting a same DSCP value for QoS files that have a same 5QI and/or ARP.

S614. The AGF entity determines an acceptable QoS file from the one or more QoS files, and for the acceptable QoS file, the AGF entity generates a correspondence between the QoS file and a VLAN priority. The correspondence between the QoS file and the VLAN priority includes a correspondence between a first QoS file and a first VLAN priority.

Optionally, the AGF entity may generate the correspondence between the QoS file and the VLAN priority based on at least one of local configuration information or a policy. This is not specifically limited in embodiments of this application. The correspondence between the QoS file and the VLAN priority includes the correspondence between the first QoS file and the first VLAN priority.

Optionally, if there are a plurality of acceptable QoS files in this embodiment of this application, the plurality of QoS files may correspond to a same VLAN priority, or the plurality of QoS files may respectively correspond to different VLAN priorities. This is not specifically limited in embodiments of this application. When the plurality of QoS files correspond to the same VLAN priority, the similar QoS files may be aggregated to have the same VLAN priority according to an aggregation principle. The aggregation principle may be, for example, setting a same VLAN priority for QoS files that have a same 5QI and/or ARP.

Optionally, for the acceptable QoS file, the AGF entity may generate a correspondence between the QoS file and a VLAN ID.

Optionally, if there are a plurality of acceptable QoS files in this embodiment of this application, the plurality of QoS files may correspond to a same VLAN ID, or the plurality of QoS files may respectively correspond to different VLAN IDs. This is not specifically limited in embodiments of this application. When the plurality of QoS files correspond to the same VLAN ID, the similar QoS files may be aggregated to have the same VLAN ID according to an aggregation principle. The aggregation principle may be, for example, setting a same VLAN ID for QoS files that have a same ARP.

S615. The AGF entity sends a fixed network configuration message to the terminal, so that the terminal receives the fixed network configuration message. The fixed network configuration message includes the correspondence between the QoS file and the VLAN priority.

Optionally, if the AGF entity further generates the correspondence between the QoS file and the VLAN ID, the fixed network configuration message further includes the correspondence between the QoS file and the VLAN ID.

S616. The AGF entity sends the PDU session establishment accept message to the terminal, so that the terminal receives the PDU session establishment accept message.

The PDU session establishment accept message sent by the AGF entity to the terminal is a forwarded PDU session establishment accept message that is sent by the SMF entity to the AGF entity by using the AMF entity.

It should be noted that in this embodiment of this application, step S615 and step S616 may not necessarily be performed in the described sequence. For example, step S615 may be performed before step S616, step S616 may be performed before step S615, or step S615 and step S616 may be simultaneously performed. This is not specifically limited in embodiments of this application.

S617 to S619 are the same as S518 to S520. For details, refer to the embodiment shown in FIG. 5.

According to the QoS control method provided in this embodiment of this application, the terminal can determine that the VLAN priority corresponding to the first QoS file is the first VLAN priority, so that when sending the uplink data packet to the access gateway function entity, the terminal can add the first VLAN priority to the uplink data packet, and the access gateway function entity performs QoS control on the uplink data packet based on the first VLAN priority. Therefore, based on the QoS control method provided in this embodiment of this application, QoS control can be implemented when a 5G core network or another future network is accessed through a fixed network.

The foregoing actions of the terminal in S601, S604, S605, S617, and S618 may be performed by the processor 301 in the communications device 300 shown in FIG. 3 by invoking application program code stored in the memory 303. This is not limited in embodiments of this application.

The foregoing actions of the AGF entity in S602, S603, S614, S615, S616, and S619 may be performed by the processor 301 in the communications device 300 shown in FIG. 3 by invoking application program code stored in the memory 303. This is not limited in embodiments of this application.

The foregoing actions of the SMF entity in S608, S609, S612, and S613 may be performed by the processor 301 in the communications device 300 shown in FIG. 3 by invoking application program code stored in the memory 303. This is not limited in embodiments of this application.

Figure 7:
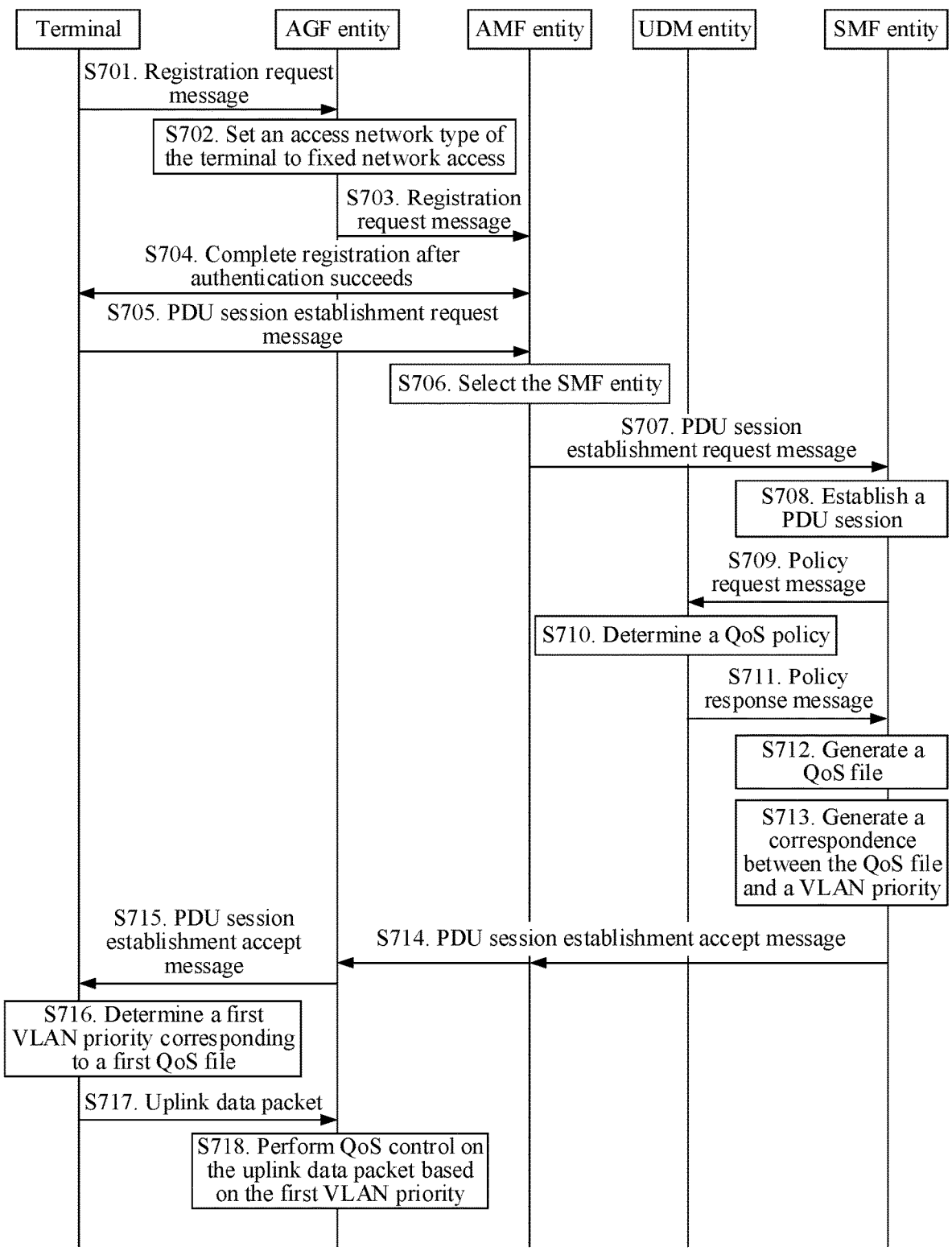
FIG. 7 is a fourth schematic flowchart of a QoS control method according to an embodiment of this application.

FIG. 7 is a schematic flowchart of another QoS control method according to an embodiment of this application. The QoS control method relates to interaction between a terminal, an AGF entity, an AMF entity, a UDM entity, and an SMF, and includes the following steps.

S701 to S712 are the same as S501 to S512. For details, refer to the embodiment shown in FIG. 5.

S713. The SMF entity generates a correspondence between a QoS file and a VLAN priority. The correspondence between the QoS file and the VLAN priority includes a correspondence between a first QoS file and a first VLAN priority.

Optionally, the SMF entity may generate the correspondence between the QoS file and the VLAN priority based on at least one of local configuration information and a QoS policy from a PCF entity or a UDM entity. The QoS policy may include the correspondence between the QoS file and the VLAN priority. This is not specifically limited in embodiments of this application.

Optionally, if there are a plurality of QoS files in this embodiment of this application, the plurality of QoS files may correspond to a same VLAN priority, or the plurality of QoS files may correspond to different VLAN priorities. This is not specifically limited in embodiments of this application. When the plurality of QoS files correspond to the same VLAN priority, the similar QoS files may be aggregated to have the same VLAN priority according to an aggregation principle. The aggregation principle may be, for example, setting a same VLAN priority for QoS files that have a same 5QI and/or ARP.

Optionally, the SMF entity may further generate a correspondence between the QoS file and a VLAN ID. The correspondence between the QoS file and the VLAN ID includes the correspondence between the first QoS file and the first VLAN ID.

Optionally, if there are a plurality of QoS files in this embodiment of this application, the plurality of QoS files may correspond to a same VLAN ID, or the plurality of QoS files may respectively correspond to different VLAN IDs. This is not specifically limited in embodiments of this application. When the plurality of QoS files correspond to the same VLAN ID, the similar QoS files may be aggregated to have the same VLAN ID according to an aggregation principle. The aggregation principle may be, for example, setting a same VLAN ID for QoS files that have a same 5QI and/or ARP.

Optionally, the SMF entity may further generate a correspondence between the QoS file and a DSCP value. The correspondence between the QoS file and the DSCP value includes a correspondence between the first QoS file and a first DSCP value.

Optionally, if there are a plurality of QoS files in this embodiment of this application, the plurality of QoS files may correspond to a same DSCP value, or the plurality of QoS files may respectively correspond to different DSCP values. This is not specifically limited in embodiments of this application. When the plurality of QoS files correspond to the same DSCP value, the similar QoS files may be aggregated to have the same DSCP value according to an aggregation principle. The aggregation principle may be, for example, setting a same DSCP value for QoS files that have a same 5QI and/or ARP.

S714. The SMF entity sends a PDU session establishment accept message to the AGF by using the AMF entity, so that the AGF entity receives the PDU session establishment accept message. The PDU session establishment accept message includes the correspondence between the QoS file and the VLAN priority.

Optionally, if the SMF entity further generates the correspondence between the QoS file and the VLAN ID, the PDU session establishment accept message further includes the correspondence between the QoS file and the VLAN ID.

Optionally, if the SMF entity further generates the correspondence between the QoS file and the DSCP value, the PDU session establishment accept message further includes the correspondence between the QoS file and the DSCP value.

S715. The AGF entity sends the PDU session establishment accept message to the terminal, so that the terminal receives the PDU session establishment accept message.

S716 to S718 are the same as S518 to S520. For details, refer to the embodiment shown in FIG. 5.

According to the QoS control method provided in this embodiment of this application, the terminal can determine that the VLAN priority corresponding to the first QoS file is the first VLAN priority, so that when sending the uplink data packet to the access gateway function entity, the terminal can add the first VLAN priority to the uplink data packet, and the access gateway function entity performs QoS control on the uplink data packet based on the first VLAN priority. Therefore, based on the QoS control method provided in this embodiment of this application, QoS control can be implemented when a 5G core network or another future network is accessed through a fixed network.

The foregoing actions of the terminal in S701, S704, S705, S716, and S717 may be performed by the processor 301 in the communications device 300 shown in FIG. 3 by invoking application program code stored in the memory 303. This is not limited in embodiments of this application.

The foregoing actions of the AGF entity in S702, S703, S715, and S718 may be performed by the processor 301 in the communications device 300 shown in FIG. 3 by invoking application program code stored in the memory 303. This is not limited in embodiments of this application.

The foregoing actions of the SMF entity in S708, S709, S712, S713, and S714 may be performed by the processor 301 in the communications device 300 shown in FIG. 3 by invoking application program code stored in the memory 303. This is not limited in embodiments of this application.

Figure 12A:
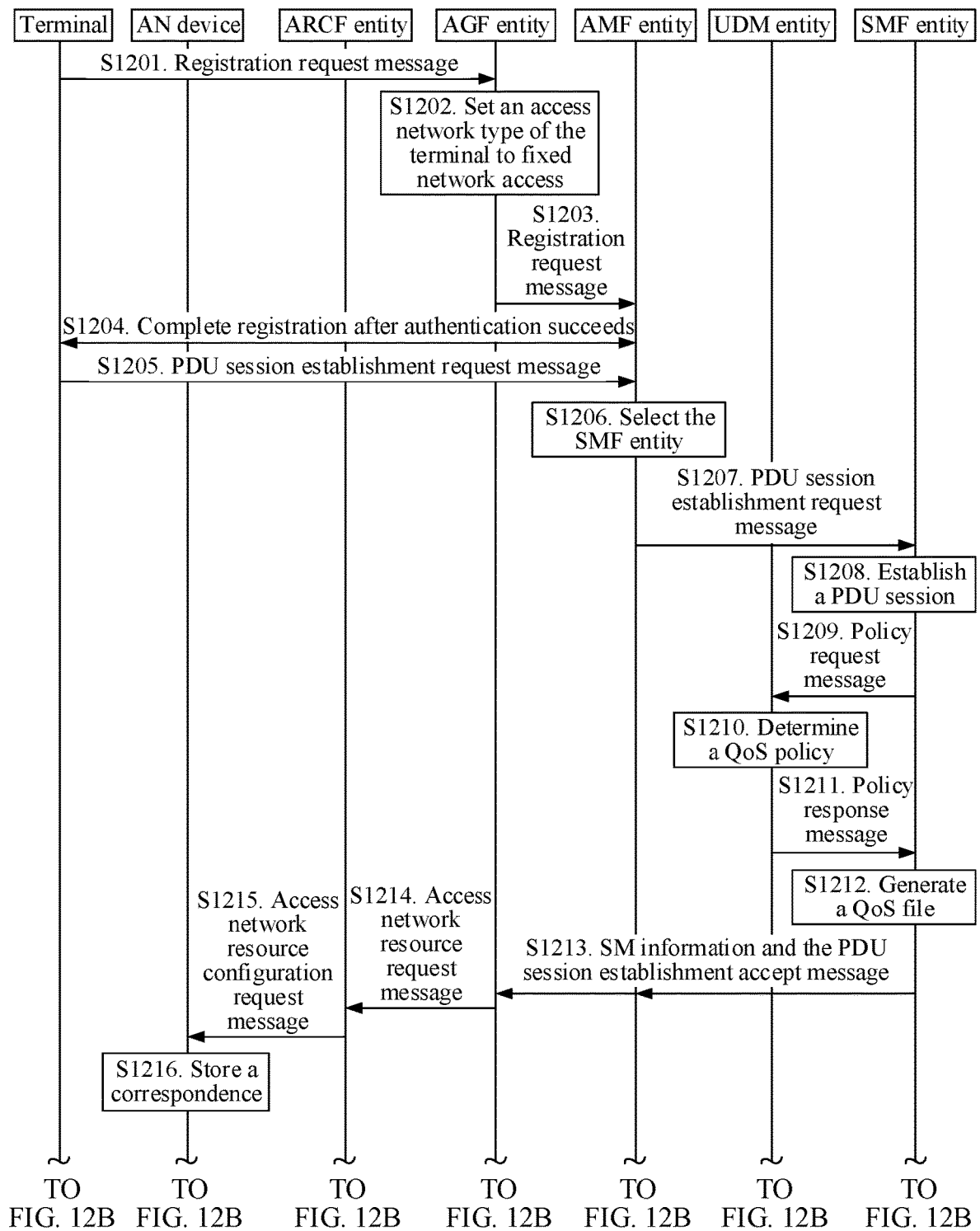
FIG. 12A, FIG. 12B are a fifth schematic flowchart of a QoS control method according to an embodiment of this application.
Figure 12B:
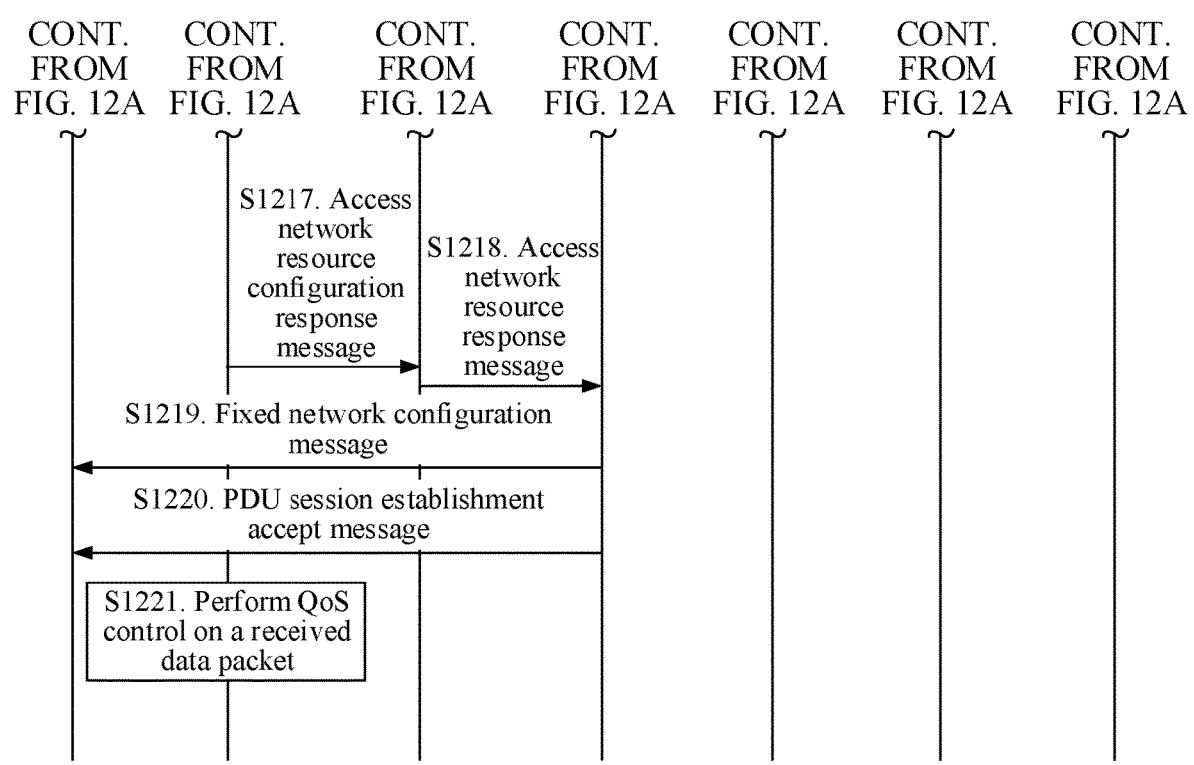

FIG. 12A, FIG. 12B are a schematic flowchart of another QoS control method according to an embodiment of this application. The QoS control method which, is described by using an example in which an ARCF entity is independent of an AGF entity, relates to interaction between a terminal, an AN device, the ARCF entity, the AGF entity, an AMF entity, a UDM entity, and an SMF entity, and includes the following steps.

S1201 to S1213 are the same as S601 to S613. For details, refer to the embodiment shown in FIG. 6.

S1214. The AGF entity sends an access network resource request message to the ARCF entity, so that the ARCF entity receives the access network resource request message from the AGF entity.

The access network resource request message carries PDU session identifier information and a QoS file. The QoS file may include at least one of a 5QI and a QoS parameter. For related description of the QoS parameter, refer to the foregoing method embodiment.

Optionally, the QoS file in this embodiment of this application may further include a QFI, and QFIs are in a one-to-one correspondence with QoS files. This is not specifically limited in embodiments of this application.

Optionally, the PDU session identifier information in this embodiment of this application may be PDU session identifier (PDU session ID) information received by the AGF entity, or may be at least one of a MAC address of the AGF, a VLAN ID, or a generic routing encapsulation (GRE) tunnel identifier that is allocated by the AGF entity and that corresponds to a PDU session. This is not specifically limited in embodiments of this application. The PDU session identifier information is used to determine a PDU session to which a data packet belongs.

Optionally, the VLAN ID in this embodiment of this application may also be referred to as a VLAN tag (Tag).

S1215. The ARCF entity sends an access network resource configuration request message to the AN device, so that the AN device receives the access network resource configuration request message from the ARCF entity.

The access network resource configuration request message includes a correspondence between the first QoS file and at least one of a first VLAN priority or a first VLAN ID.

Optionally, in this embodiment of this application, the correspondence that is in the access network resource configuration request message and that is between the first QoS file and at least one of the first VLAN priority or the first VLAN ID may be obtained by the ARCF entity in the following manners.

Manner 1: The access network resource request message in step S1214 carries the correspondence between the first QoS file and at least one of the first VLAN priority or the first VLAN ID, and further the ARCF entity obtains the correspondence between the first QoS file and at least one of the first VLAN priority or the first VLAN ID from the access network resource request message. For a manner in which the AGF entity obtains the correspondence between the first QoS file and at least one of the first VLAN priority or the first VLAN ID, refer to the foregoing embodiments shown in FIG. 5 to FIG. 7.

Manner 2: The ARCF entity may determine an acceptable first QoS file from received QoS files.

For the acceptable first QoS file, the ARCF entity may generate the correspondence between the first QoS file and the first VLAN ID based on PDU session identifier information corresponding to the first QoS file, where the first VLAN ID includes the PDU session identifier information; or the ARCF entity may generate the correspondence between the first QoS file and the first VLAN ID based on a QFI or a 5QI in the first QoS file, where the first VLAN ID includes the 5QI or the QFI; or the ARCF entity may generate the correspondence between the first QoS file and the first VLAN ID based on PDU session identifier information corresponding to the first QoS file and a QFI or a 5QI in the first QoS file, where the first VLAN ID includes the PDU session identifier information and the 5QI or the QFI; and/or the ARCF entity may generate the correspondence between the first QoS file and the first VLAN priority based on the first QoS file and a local policy.

Optionally, in this embodiment of this application, when the data packet of the PDU session is encapsulated, if the first VLAN ID includes the PDU session identifier information and the 5QI or the QFI, the data packet of the PDU session may be encapsulated by using a double-layer VLAN ID.

Optionally, in this embodiment of this application, when the data packet of the PDU session is encapsulated, if the first VLAN ID includes only one piece of information of the PDU session identifier information, the 5QI, or the QFI, the other information may be carried by using another parameter, for example, carried in a GRE packet header, or carried in a MAC address. This is not specifically limited in embodiments of this application.

For related descriptions of the correspondence between the first QoS file and the first VLAN priority or the first VLAN ID, refer to the foregoing embodiments shown in FIG. 5 to FIG. 7.

S1216. The AN device stores the correspondence between the first QoS file and at least one of the first VLAN priority or the first VLAN ID.

In this way, in a subsequent procedure, the AN device can perform QoS control on a received data packet based on the correspondence and the first VLAN priority or the first VLAN ID carried in the received data packet.

S1217. The AN device sends an access network resource configuration response message to the ARCF entity, so that the ARCF entity receives the access network resource configuration response message from the AN device.

S1218. The ARCF entity sends the access network resource configuration response message to the AGF entity, so that the AGF entity receives the access network resource configuration response message from the ARCF entity.

Optionally, if the correspondence between the first QoS file and at least one of the first VLAN priority or the first VLAN ID is generated by the ARCF entity, the access network resource response message may further carry the correspondence between the first QoS file and at least one of the first VLAN priority or the first VLAN ID. After receiving the access network resource response message, the AGF entity may store the correspondence between the first QoS file and at least one of the first VLAN priority or the first VLAN ID. This is not specifically limited in embodiments of this application.

Optionally, in Manner 1 of step S1215, the ARCF entity may further determine that the first QoS file is an acceptable QoS file, and further add, to the access network resource response message sent to the AGF entity, an acceptable first QoS file determined by the ARCF entity. Alternatively, in Manner 2 of step S1215, after determining the acceptable first QoS file in the received QoS files, the ARCF entity may further add, to the access network resource response message sent to the AGF entity, the acceptable first QoS file determined by the ARCF entity. In this way, after receiving the access network resource response message, the AGF entity may determine that the first QoS file is an acceptable QoS file, and further may perform a subsequent operation.

S1219. The AGF entity sends a fixed network configuration message to the terminal, so that the terminal receives the fixed network configuration message. The fixed network configuration message carries the correspondence between the first QoS file and the first VLAN priority.

It should be noted that step S1219 is an optional step. If the foregoing correspondence does not include the correspondence between the first QoS file and the first VLAN priority, step S1219 may not need to be performed.

In addition, the terminal may alternatively obtain the correspondence between the first QoS file and the first VLAN priority in the manner in the embodiment shown in FIG. 5 or FIG. 7. For details, refer to the embodiment shown in FIG. 5 or FIG. 7.

S1220. The AGF entity sends a PDU session establishment accept message to the terminal, so that the terminal receives the PDU session establishment accept message from the AGF entity.

The PDU session establishment accept message sent by the AGF entity to the terminal is a forwarded PDU session establishment accept message that is sent by the SMF entity to the AGF entity by using the AMF entity.

S1221. The AN device performs QoS control on the received data packet based on the stored correspondence and the first VLAN ID or the first VLAN priority carried in the received data packet.

Optionally, in this embodiment of this application, the data packet received by the AN device may be an uplink data packet sent by the terminal to the AN device, or may be a downlink data packet sent by the AGF entity to the AN device. This is not specifically limited in embodiments of this application.

Optionally, if the correspondence stored by the AN device is the correspondence between the first QoS file and the first VLAN priority, and the received data packet carries the first VLAN priority, that the AN device performs QoS control on the received data packet based on the stored correspondence and the first VLAN priority carried in the received data packet includes: the AN device determines the first QoS file based on the first VLAN priority and the correspondence, and further the AN device performs QoS control on the received data packet based on the first QoS file.

Optionally, if the correspondence stored by the AN device is the correspondence between the first QoS file and the first VLAN ID, and the received data packet carries the first VLAN ID, that the AN device performs QoS control on the received data packet based on the stored correspondence and the first VLAN ID carried in the received data packet includes: the AN device determines the first QoS file based on the first VLAN ID and the correspondence, and further the AN device performs QoS control on the received data packet based on the first QoS file.

Optionally, if the correspondence stored by the AN device is the correspondence between the first QoS file and the first VLAN priority, and the received data packet carries the first VLAN ID, that the AN device performs QoS control on the received data packet based on the stored correspondence and the first VLAN ID carried in the received data packet includes: the AN device determines the first VLAN priority corresponding to the first VLAN ID, and further after determining the first QoS file based on the first VLAN priority and the correspondence, the AN device performs QoS control on the received data packet based on the first QoS file.

Optionally, in this embodiment of this application, that the AN device performs QoS control on the received data packet based on the first QoS file may specifically include: the AN device determines a processing sequence, a processing delay, a packet loss rate, or the like of the data packet based on the 5QI in the first QoS file; or the AN device allocates a bandwidth resource to the data packet, controls a sending rate of the data packet, or the like based on a guaranteed bandwidth, an MFBR, or a GFBR in the first QoS file.

Optionally, in this embodiment of this application, if the data packet received by the AN device does not carry the first VLAN priority, the AN device may set a VLAN priority in an L2 packet header of the received data packet as the first VLAN priority after determining the first VLAN priority. In this way, subsequently, a device can perform QoS control on the received data packet based on the first VLAN priority. For example, if the data packet received by the AN device is sent by the terminal to the AN device, after the AN device sets the VLAN priority in the L2 packet header of the received data packet as the first VLAN priority, the AGF entity can perform QoS control on the received data packet based on the first VLAN priority.

In the QoS control method provided in this embodiment of this application, after receiving the first QoS file, the ARCF entity can obtain the correspondence between the first QoS file and at least one of the first VLAN ID or the first VLAN priority, and further can send the correspondence to the AN device. In this way, after receiving the data packet, the AN device can perform QoS control on the received data packet based on the correspondence and the first VLAN priority or the first VLAN ID carried in the received data packet. Therefore, based on the QoS control method provided in this embodiment of this application, QoS control when a 5G core network or another future network is accessed through a fixed network can be implemented.

The foregoing actions of the AN device, the ARCF entity, the AGF entity, or the AMF entity in S1201 to S1221 may be performed by the processor 301 in the communications device 300 shown in FIG. 3 by invoking application program code stored in the memory 303. This is not limited in embodiments of this application.

Optionally, the QoS control method provided in this embodiment of this application may further include: receiving, by the terminal, a downlink data packet from the AGF, where the downlink data packet carries a first VLAN priority; and further, sending, by the terminal, an uplink data packet corresponding to the downlink data packet to the AGF entity, where the uplink data packet carries the first VLAN priority. Specifically, when forwarding the downlink data packet, the AGF entity may set a VLAN priority in an L2 packet header of the downlink data packet as the first VLAN priority based on a correspondence between a first QoS file and the first VLAN priority. When sending uplink data, the terminal may determine, based on flow information of the downlink data packet, the uplink data packet corresponding to the downlink data packet, and set a VLAN priority in an L2 packet header of the uplink data packet as the first VLAN priority the same as that of the downlink data packet. The flow information in this embodiment of this application is specifically IP quintuple information, and includes at least one of a source IP address, a destination IP address, a source port number, a destination port number, and a protocol type.

Based on this solution, the terminal can determine the first VLAN priority carried in the uplink data packet based on the first VLAN priority carried in the downlink data packet, so that the AGF entity can perform QoS control on the uplink data packet based on the first VLAN priority. Therefore, based on the QoS control method provided in this embodiment of this application, QoS control can be implemented when a 5G core network or another future network is accessed through a fixed network.

The foregoing mainly describes the solutions provided in the embodiments of this application from a perspective of interaction between the network elements. It may be understood that, to implement the foregoing functions, the access gateway function entity and the session management function entity include corresponding hardware structures and/or software modules for performing the functions. A person skilled in the art should be easily aware that, in combination with the examples described in the embodiments disclosed in this specification, units, and algorithm steps, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function module division may be performed on the access gateway function entity and the session management function entity based on the foregoing method examples. For example, function modules may be divided corresponding to functions, or two or more functions may be integrated into one processing module. The integrated module may be implemented in a form of hardware, or may be implemented in a form of a software function module. It should be noted that, in this embodiment of this application, module division is an example, and is merely a logical function division. During actual implementation, another division manner may be used.

Figure 8:
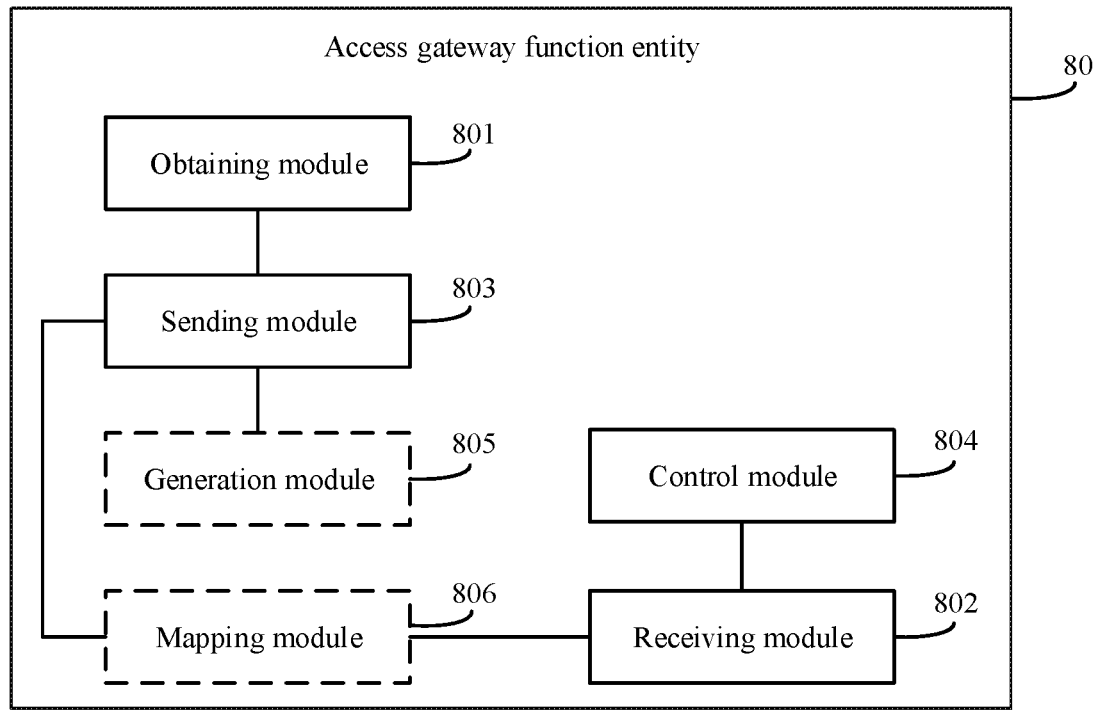
FIG. 8 is a first schematic structural diagram of an access gateway function entity according to an embodiment of this application.

For example, when the function modules are divided corresponding to the functions, FIG. 8 is a possible schematic structural diagram of the access gateway function entity 80 in the foregoing embodiments. The access gateway function entity 80 includes an obtaining module 801, a receiving module 802, a sending module 803, and a control module 804.

The obtaining module 801 is configured to obtain a correspondence between a QoS file and a VLAN priority, where the correspondence between the QoS file and the VLAN priority includes a correspondence between a first QoS file and a first VLAN priority. The sending module 803 is configured to send a first message to a terminal, where the first message includes the correspondence between the QoS file and the VLAN priority. The receiving module 802 is configured to receive an uplink data packet from the terminal, where a QoS file corresponding to the uplink data packet is the first QoS file, and the uplink data packet carries the first VLAN priority. The control module 804 is configured to perform QoS control on the uplink data packet based on the first VLAN priority.

Further, the obtaining module 801 is configured to generate the correspondence between the QoS file and the VLAN priority.

Alternatively, the obtaining module 801 is configured to receive a second message from a session management function entity, where the second message includes the correspondence between the QoS file and the VLAN priority.

In a possible implementation, the first message is a fixed network configuration message.

Further, the fixed network configuration message further includes a correspondence between the QoS file and a VLAN ID, and the correspondence between the QoS file and the VLAN ID includes a correspondence between the first QoS file and a first VLAN ID. The obtaining module 801 is further configured to obtain the correspondence between the QoS file and the VLAN ID before the sending module 803 sends the first message to the terminal.

Further, the receiving module 802 is further configured to receive a PDU session establishment accept message from the SMF entity, where the PDU session establishment accept message includes a correspondence between the QoS file and a DSCP value, and the correspondence between the QoS file and the DSCP value includes the correspondence between the first QoS file and the first DSCP value. The sending module 803 is further configured to send the PDU session establishment accept message to the terminal.

In a possible implementation, the first message is the PDU session establishment accept message.

Further, the sending module 803 is further configured to send a third message to the session management function entity after the obtaining module 801 generates the correspondence between the QoS file and the VLAN priority and before the sending module 803 sends the first message to the terminal, where the third message includes the correspondence between the QoS file and the VLAN priority. The receiving module 802 is further configured to receive the first message from the session management function entity.

Further, as shown in FIG. 8, the access gateway function entity 80 further includes a generation module 805. The third message and the PDU session establishment accept message further include the correspondence between the QoS file and the VLAN ID, and the correspondence between the QoS file and the VLAN ID includes the correspondence between the first QoS file and the first VLAN ID. The generation module 805 is configured to generate the correspondence between the QoS file and the VLAN ID before the sending module 803 sends the third message to the session management function entity.

Further, the PDU session establishment accept message includes a correspondence between the QoS file and a DSCP value, and the correspondence between the QoS file and the DSCP value includes a correspondence between the first QoS file and a first DSCP value.

Optionally, that the uplink data packet carries the first VLAN priority includes: a VLAN priority in an L2 packet header of the uplink data packet is the first VLAN priority.

In a possible implementation, the access gateway function entity 80 further includes a mapping module 806. The mapping module 806 is configured to map a VLAN ID in the L2 packet header of the uplink data packet to a QFI value, where the VLAN ID in the L2 packet header is the first VLAN ID. The sending module 803 is further configured to send the uplink data packet to a UP function entity, where a packet header of the uplink data packet includes the QFI value.

In a possible implementation, the mapping module 806 is further configured to map a DSCP value in an IP header of the uplink data packet to a QFI value, where the DSCP value in the IP header is the first DSCP value. The sending module 803 is further configured to send the uplink data packet to the UP function entity, where a packet header of the uplink data packet includes the QFI value.

All related content of steps in the foregoing method embodiments may be cited in function descriptions of corresponding function modules.

Figure 9:
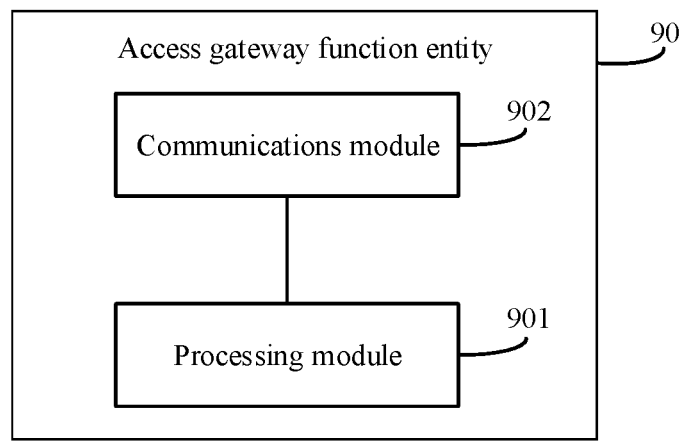
FIG. 9 is a second schematic structural diagram of an access gateway function entity according to an embodiment of this application.

When the function modules are divided in an integrated manner, FIG. 9 is a possible schematic structural diagram of the access gateway function entity 90 in the foregoing embodiments. The access gateway function entity 90 includes a processing module 901 and a communications module 902. The processing module 901 may be configured to perform operations that can be performed by the obtaining module 801, the control module 804, the generation module 805, and the mapping module 806 in FIG. 8, and the communications module 902 may be configured to perform operations that can be performed by the receiving module 802 and the sending module 803 in FIG. 8. For details, refer to the embodiment shown in FIG. 8.

All related content of steps in the foregoing method embodiments may be cited in function descriptions of corresponding function modules.

In this embodiment, the access gateway function entity is presented in a form in which the function modules are divided corresponding to the functions, or the access gateway function entity is presented in a form in which the function modules are divided in an integrated manner. The "module" herein may be an application-specific integrated circuit (ASIC), a circuit, a processor executing one or more software or firmware programs, a memory, an integrated logic circuit, and/or another component that can provide the foregoing function. In a simple embodiment, a person skilled in the art may figure out that the access gateway function entity 80 or the access gateway function entity 90 may be in the form shown in FIG. 3. For example, the obtaining module 801, the receiving module 802, the sending module 803, and the control module 804 in FIG. 8 may be implemented by the processor 301 and the memory 303 in FIG. 3. Specifically, the obtaining module 801, the receiving module 802, the sending module 803, and the control module 804 may be implemented by the processor 301 by invoking the application program code stored in the memory 303. This is not limited in embodiments of this application. Alternatively, for example, the obtaining module 801, the receiving module 802, the sending module 803, the control module 804, the generation module 805, and the mapping module 806 in FIG. 8 may be implemented by the processor 301 and the memory 303 in FIG. 3. Specifically, the obtaining module 801, the receiving module 802, the sending module 803, the control module 804, the generation module 805, and the mapping module 806 may be performed by the processor 301 by invoking the application program code stored in the memory 303. This is not limited in embodiments of this application. Alternatively, for example, the processing module 901 and the communications module 902 in FIG. 9 may be implemented by the processor 301 and the memory 303 in FIG. 3. Specifically, the processing module 901 and the communications module 902 may be implemented by the processor 301 by invoking the application program code stored in the memory 303. This is not limited in embodiments of this application.

The access gateway function entity provided in this embodiment of this application may be configured to perform the foregoing QoS control method. Therefore, for a technical effect that can be obtained by the access gateway function entity, refer to the foregoing method embodiment.

Figure 10:
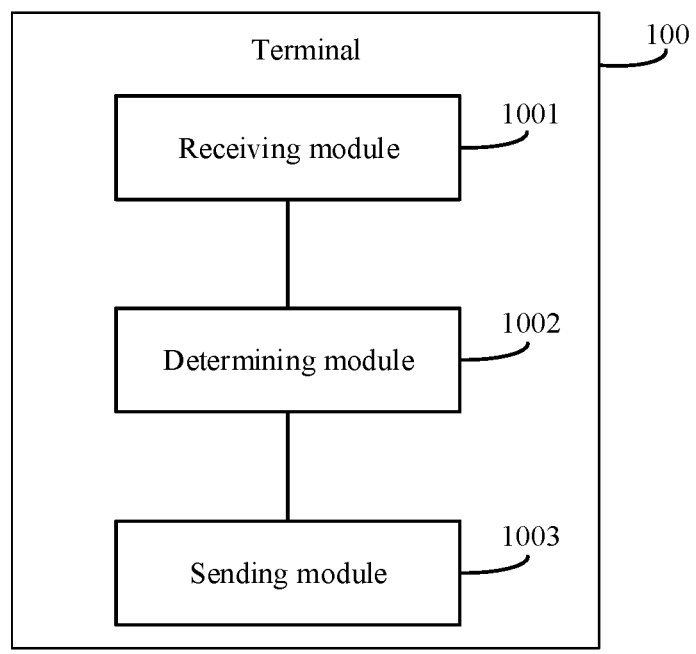
FIG. 10 is a first schematic structural diagram of a terminal according to an embodiment of this application.

For example, when the function modules are divided corresponding to the functions, FIG. 10 is a possible schematic structural diagram of the terminal in the foregoing embodiments. The terminal 100 includes a receiving module 1001, a determining module 1002, and a sending module 1003.

The receiving module 1001 is configured to receive a first message from an access gateway function entity, where the first message includes a correspondence between a QoS file and a VLAN priority, and the correspondence between the QoS file and the VLAN priority includes a correspondence between a first QoS file and a first VLAN priority. The determining module 1002 is configured to determine, based on the correspondence, that a VLAN priority corresponding to the first QoS file is the first VLAN priority, where the first QoS file is a QoS file corresponding to a to-be-sent uplink data packet. The sending module 1003 is configured to send an uplink data packet to the access gateway function entity, where the uplink data packet carries the first VLAN priority.

Optionally, the first message is a fixed network configuration message; or the first message is a PDU session establishment accept message.

Optionally, that the uplink data packet carries the first VLAN priority includes: a VLAN priority in an L2 packet header of the uplink data packet is the first VLAN priority.

Optionally, a VLAN ID in the L2 packet header of the uplink data packet is a first VLAN ID.

In a possible implementation, the first message further includes a correspondence between the QoS file and a VLAN ID, and the correspondence between the QoS file and the VLAN ID includes a correspondence between the first QoS file and the first VLAN ID. The determining module 1002 is further configured to: after the receiving module 1001 receives the first message from the access gateway function entity, and before the sending module 1003 sends the uplink data packet to the access gateway function entity, determine, based on the correspondence between the QoS file and the VLAN ID, the first VLAN ID corresponding to the first QoS file.

In a possible implementation, the determining module 1002 is further configured to: before the sending module 1003 sends the uplink data packet to the access gateway function entity, determine that the first VLAN ID corresponding to the first QoS file is a first QFI value included in the first QoS file.

Optionally, a DSCP value in an IP header of the uplink data packet is a first DSCP value.

In a possible implementation, the first message is the fixed network configuration message. The receiving module 1001 is further configured to: before the sending module 1003 sends the uplink data packet to the access gateway function entity, receive a PDU session establishment accept message from the access gateway function entity, where the PDU session establishment accept message includes a correspondence between the QoS file and the DSCP value, and the correspondence between the QoS file and the DSCP value includes a correspondence between the first QoS file and the first DSCP value. The determining module 1002 is further configured to determine, based on the correspondence between the QoS file and the DSCP value, the first DSCP value corresponding to the first QoS file.

In a possible implementation, the first message is the PDU session establishment accept message. Further, the first message further includes a correspondence between the QoS file and the DSCP value, and the correspondence between the QoS file and the DSCP value includes the correspondence between the first QoS file and the first DSCP value. The determining module 1002 is further configured to: after the receiving module 1001 receives the first message from the access gateway function entity, and before the sending module 1003 sends the uplink data packet to the access gateway function entity, determine, based on the correspondence between the QoS file and the DSCP value, the first DSCP value corresponding to the first QoS file.

In a possible implementation, the determining module 1002 is further configured to: before the sending module 1003 sends the uplink data packet to the access gateway function entity, determine that the first DSCP value corresponding to the first QoS file is the first QFI value included in the first QoS file.

All related content of steps in the foregoing method embodiments may be cited in function descriptions of corresponding function modules.

Figure 11:
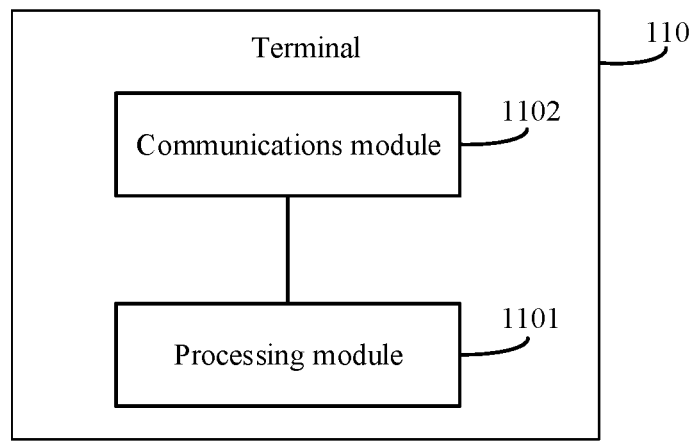
FIG. 11 is a second schematic structural diagram of a terminal according to an embodiment of this application.

When the function modules are divided in an integrated manner, FIG. 11 is a possible schematic structural diagram of the terminal 110 in the foregoing embodiments. The terminal 110 includes a processing module 1101 and a communications module 1102. The processing module 1101 may be configured to perform operations that can be performed by the determining module 1002 in FIG. 10, and the communications module 1102 may be configured to perform operations that can be performed by the receiving module 1001 and the sending module 1003 in FIG. 10. For details, refer to the embodiment shown in FIG. 10.

All related content of steps in the foregoing method embodiments may be cited in function descriptions of corresponding function modules.

In this embodiment, the terminal is presented in a form in which the function modules are divided corresponding to the functions, or the terminal is presented in a form in which the function modules are divided in an integrated manner. The "module" herein may refer to a specific ASIC, a circuit, a processor executing one or more software or firmware programs, a memory, an integrated logic circuit, and/or another component that can provide the foregoing function. In a simple embodiment, a person skilled in the art may figure out that the terminal 100 or the terminal 110 may be in the form shown in FIG. 3. For example, the receiving module 1001, the determining module 1002, and the sending module 1003 in FIG. 10 may be implemented by the processor 301 and the memory 303 in FIG. 3. Specifically, the receiving module 1001, the determining module 1002, and the sending module 1003 may be performed by the processor 301 by invoking the application program code stored in the memory 303. This is not limited in embodiments of this application. Alternatively, the processing module 1101 and the communications module 1102 in FIG. 11 may be implemented by the processor 301 and the memory 303 in FIG. 3. Specifically, the processing module 1101 and the communications module 1102 may be executed by the processor 301 by invoking the application program code stored in the memory 303. This is not limited in embodiments of this application.

The terminal provided in this embodiment of this application may be configured to perform the foregoing QoS control method. Therefore, for a technical effect that can be obtained by the terminal, refer to the foregoing method embodiments.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, including one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to the embodiments herein, in a process of implementing this application that claims protection, a person skilled in the art may understand and implement another variation of the disclosed embodiments by viewing the accompanying drawings, disclosed content, and the appended claims. In the claims, "comprising" (comprising) does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, obviously, various modifications and combinations may be made to them without departing from the spirit and scope of this application. Correspondingly, this specification and the accompanying drawings are merely example description of this application defined by the appended claims, and is considered as any or all of modifications, variations, combinations or equivalents that cover the scope of this application. Obviously, a person skilled in the art can make various modifications and variations to this application without departing from the spirit and scope of this application. This application is intended to cover these modifications and variations of this application provided that the modifications and variations of this application fall within the scope defined by the claims in this application and equivalent technologies of the claims.

What is claimed is:

1. A quality of service (QoS) control method, wherein the method comprises: obtaining, by an access gateway function entity, a correspondence between a QoS file and a virtual local area network (VLAN) priority, wherein the correspondence between the QoS file and the VLAN priority comprises a correspondence between a first QoS file and a first VLAN priority;

sending, by the access gateway function entity, a first message to a terminal, wherein the first message comprises the correspondence between the QoS file and the VLAN priority;

receiving, by the access gateway function entity, an uplink data packet from the terminal, wherein a QoS file corresponding to the uplink data packet is the first QoS file, and the uplink data packet carries the first VLAN priority, and the first VLAN priority is in a layer-2 (L2) packet header of the uplink data packet; and performing, by the access gateway function entity, QoS control on the uplink data packet based on the first VLAN priority.

2. The method according to claim 1, wherein the obtaining, by an access gateway function entity, a correspondence between a QoS file and a VLAN priority comprises:

generating, by the access gateway function entity, the correspondence between the QoS file and the VLAN priority; or receiving, by the access gateway function entity, a second message from a session management function entity, wherein the second message comprises the correspondence between the QoS file and the VLAN priority.

3. The method according to claim 1, wherein the first message is a fixed network configuration message.

4. The method according to claim 3, wherein the fixed network configuration message further comprises a correspondence between the QoS file and a VLAN identifier (ID), and the correspondence between the QoS file and the VLAN ID comprises a correspondence between the first QoS file and a first VLAN ID; and before the sending, by the access gateway function entity, a first message to a terminal, the method further comprises:

obtaining, by the access gateway function entity, the correspondence between the QoS file and the VLAN ID.

5. The method according to claim 3, wherein the method further comprises:

receiving, by the access gateway function entity, a packet data unit (PDU) session establishment accept message from a session management function entity, wherein the PDU session establishment accept message comprises a correspondence between the QoS file and a differentiated services code point (DSCP) value, and the correspondence between the QoS file and the DSCP value comprises a correspondence between the first QoS file and a first DSCP value; and sending, by the access gateway function entity, the PDU session establishment accept message to the terminal.

6. The method according to claim 1, wherein the method further comprises: mapping, by the access gateway function entity, a VLAN ID in the L2 packet header of the uplink data packet to a QoS flow identifier (QFI) value, wherein the VLAN ID in the L2 packet header is the first VLAN ID; and sending, by the access gateway function entity, the uplink data packet to a user plane (UP) function entity, wherein a packet header of the uplink data packet comprises the QFI value.

7. A communication device, comprising at least one processor and a memory, wherein the at least one processor is configured to couple to the memory, and read computer-executable instructions in the memory, wherein the computer-executable instructions, when executed by the at least one processor, cause the at least one processor to:

receive a first message from an access gateway function entity, wherein the first message comprises a correspondence between a quality of service (QoS) file and a virtual local area network (VLAN) priority, and the correspondence between the QoS file and the VLAN priority comprises a correspondence between a first QoS file and a first VLAN priority;

determine, based on the correspondence, that a VLAN priority corresponding to the first QoS file is the first VLAN priority, wherein the first QoS file is a QoS file corresponding to a to-be-sent uplink data packet, and the first VLAN priority is in a layer-2 (L2) packet header of the uplink data packet; and send the uplink data packet to the access gateway function entity, wherein the uplink data packet carries the first VLAN priority.

8. The communication device according to claim 7, wherein the first message is a fixed network configuration message; or the first message is a packet data unit PDU session establishment accept message.

9. The communication device according to claim 8, wherein a VLAN identifier (ID) in the L2 packet header of the uplink data packet is a first VLAN ID.

10. The communication device according to claim 9, wherein the first message further comprises a correspondence between the QoS file and a VLAN ID, and the correspondence between the QoS file and the VLAN ID comprises a correspondence between the first QoS file and the first VLAN ID; and wherein the computer-executable instructions instruct the at least one processor to:

determine, based on the correspondence between the QoS file and the VLAN ID, the first VLAN ID corresponding to the first QoS file.

11. The communication device according to claim 9, wherein the computer-executable instructions instruct the at least one processor to:

determine that the first VLAN ID corresponding to the first QoS file is a first QoS flow identifier (QFI) value comprised in the first QoS file.

12. A quality of service (QoS) control system, wherein the QoS control system comprises an access gateway function entity and a session management function entity, wherein the session management function entity is configured to:
obtain a correspondence between a QoS file and a virtual local area network (VLAN) priority, and send a second message to the access gateway function entity, wherein the second message comprises the correspondence between the QoS file and the VLAN priority, and the correspondence between the QoS file and the VLAN priority comprises a correspondence between a first QoS file and a first VLAN priority; and the access gateway function entity is configured to:
receive the second message from the session management function entity, and send a first message to a terminal, wherein the first message comprises the correspondence between the QoS file and the VLAN priority; and receive an uplink data packet from the terminal, and perform QoS control on the uplink data packet based on the first VLAN priority carried in the uplink data packet, wherein a QoS file corresponding to the uplink data packet is the first QoS file, and the first VLAN priority is in a layer-3 (L2) packet header of the uplink data packet.

13. The QoS control system according to claim 12, wherein that the session management function entity is configured to obtain a correspondence between a QoS file and a VLAN priority comprises the session management function entity generates the correspondence between the QoS file and the VLAN priority.

14. The QoS control system according to claim 12, wherein the first message is a fixed network configuration message, wherein the fixed network configuration message further comprises a correspondence between the QoS file and a VLAN identifier (ID), and the correspondence between the QoS file and the VLAN ID comprises a correspondence between the first QoS file and a first VLAN ID; and the access gateway function entity is further configured to obtain the correspondence between the QoS file and the VLAN ID.

15. The QoS control system according to claim 14, the access gateway function entity is further configured to: receive a packet data unit (PDU) session establishment accept message from the session management function entity, wherein the PDU session establishment accept message comprises a correspondence between the QoS file and a differentiated services code point (DSCP) value, and the correspondence between the QoS file and the DSCP value comprises a correspondence between the first QoS file and a first DSCP value; and send the PDU session establishment accept message to the terminal.

16. The QoS control system according to claim 12, the access gateway function entity is further configured to: map a VLAN ID in the L2 packet header of the uplink data packet to a QoS flow identifier (QFI) value, wherein the VLAN ID in the L2 packet header is the first VLAN ID; and send the uplink data packet to a user plane (UP) function entity, wherein a packet header of the uplink data packet comprises the QFI value.

* * * * *